United States Patent
Yang et al.

(10) Patent No.: US 12,171,024 B2
(45) Date of Patent: Dec. 17, 2024

(54) SCRAMBLING SEQUENCES FOR REQUEST-TO-SEND (RTS) AND CLEAR-TO-SEND (CTS) FRAMES

(71) Applicant: QUALCOMM Incorporated, San Diego, CA (US)

(72) Inventors: Lin Yang, San Diego, CA (US); Youhan Kim, Saratoga, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/335,243

(22) Filed: Jun. 1, 2021

(65) Prior Publication Data

US 2021/0410188 A1    Dec. 30, 2021

Related U.S. Application Data

(60) Provisional application No. 63/045,186, filed on Jun. 28, 2020.

(51) Int. Cl.
*H04W 74/0816*    (2024.01)
*H04L 27/26*    (2006.01)
(Continued)

(52) U.S. Cl.
CPC ..... *H04W 74/0816* (2013.01); *H04L 27/2617* (2013.01); *H04W 74/002* (2013.01); *H04W 84/12* (2013.01)

(58) Field of Classification Search
None
See application file for complete search history.

(56) References Cited

U.S. PATENT DOCUMENTS 9,119,110 B2    8/2015    Merlin et al.
10,701,686 B1 *    6/2020    Kwon ............... H04W 72/0446
(Continued)

FOREIGN PATENT DOCUMENTS

WO    WO-2012040495 A1    3/2012

OTHER PUBLICATIONS

Chen, X., (Intel), et al., "EHT PPDU Scrambler", IEEE Draft, 11-20-0563-00-00BE-EHT-PPDU-Scrambler, IEEE 802.11-20/0563r0, IEEE-SA Mentor, Piscataway, NJ, USA, vol. 802.11 EHT, 802.11be, Mar. 25, 2020 (Mar. 25, 2020), Apr. 9, 2020 (Apr. 9, 2020), XP068167437, pp. 1-13, Retrieved from the Internet: URL: https://mentor.ieee.org/802.11/dcn/20/11-20-0563-00-00be-eht-ppdu-scrambler.pptx [retrieved on Apr. 9, 2020] p. 3-p. 5, pp. 8,12,13, Slides 3 and 8.

(Continued)

*Primary Examiner* — Rebecca E Song
(74) *Attorney, Agent, or Firm* — Holland & Hart LLP

(57) ABSTRACT

This disclosure provides systems, methods, and apparatuses for wireless communication that can be used to reduce the peak-to-average power ratio (PAPR) of data transmissions by increasing the degree of randomness with which data is scrambled for transmission over a wireless medium. In some implementations, a transmitting device may determine a scrambler seed value that includes at least 11 bits, where at least one of the 7 least significant bits (LSBs) of the scrambler seed value has a non-zero value. The transmitting device may generate a scrambling sequence based on the scrambler seed value and a polynomial, may construct a physical layer convergence protocol (PLCP) protocol data unit (PPDU) that includes a multi-user (MU) request-to-send (RTS) frame and the scrambler seed value, may scramble one or more portions of the PPDU based on the scrambling (Continued)

sequence; and may transmit the PPDU over a wireless medium.

26 Claims, 18 Drawing Sheets

(51) Int. Cl.
*H04W 74/00* (2009.01)
*H04W 84/12* (2009.01)

(56) References Cited

U.S. PATENT DOCUMENTS

| | | | |
|---|---|---|---|
| 2011/0051825 A1* | 3/2011 | Tao | H04L 27/2602 375/260 |
| 2012/0314869 A1* | 12/2012 | Zhang | H04W 56/004 380/287 |
| 2015/0312386 A1* | 10/2015 | Lee | H04L 69/04 370/338 |
| 2016/0227441 A1* | 8/2016 | Park | H04W 74/0816 |
| 2017/0048095 A1 | 2/2017 | Sun et al. | |
| 2017/0104563 A1* | 4/2017 | Lee | H04W 72/121 |
| 2017/0332277 A1 | 11/2017 | Xin et al. | |
| 2019/0052327 A1* | 2/2019 | Motozuka | H04L 1/0041 |
| 2019/0393901 A1* | 12/2019 | Fainzilber | H03M 13/35 |
| 2020/0220754 A1* | 7/2020 | Hunter | H04W 74/0816 |
| 2021/0345403 A1* | 11/2021 | Kneckt | H04W 74/008 |

OTHER PUBLICATIONS

International Search Report and Written Opinion—PCT/US2021/035374—ISA/EPO—Sep. 27, 2021.

* cited by examiner

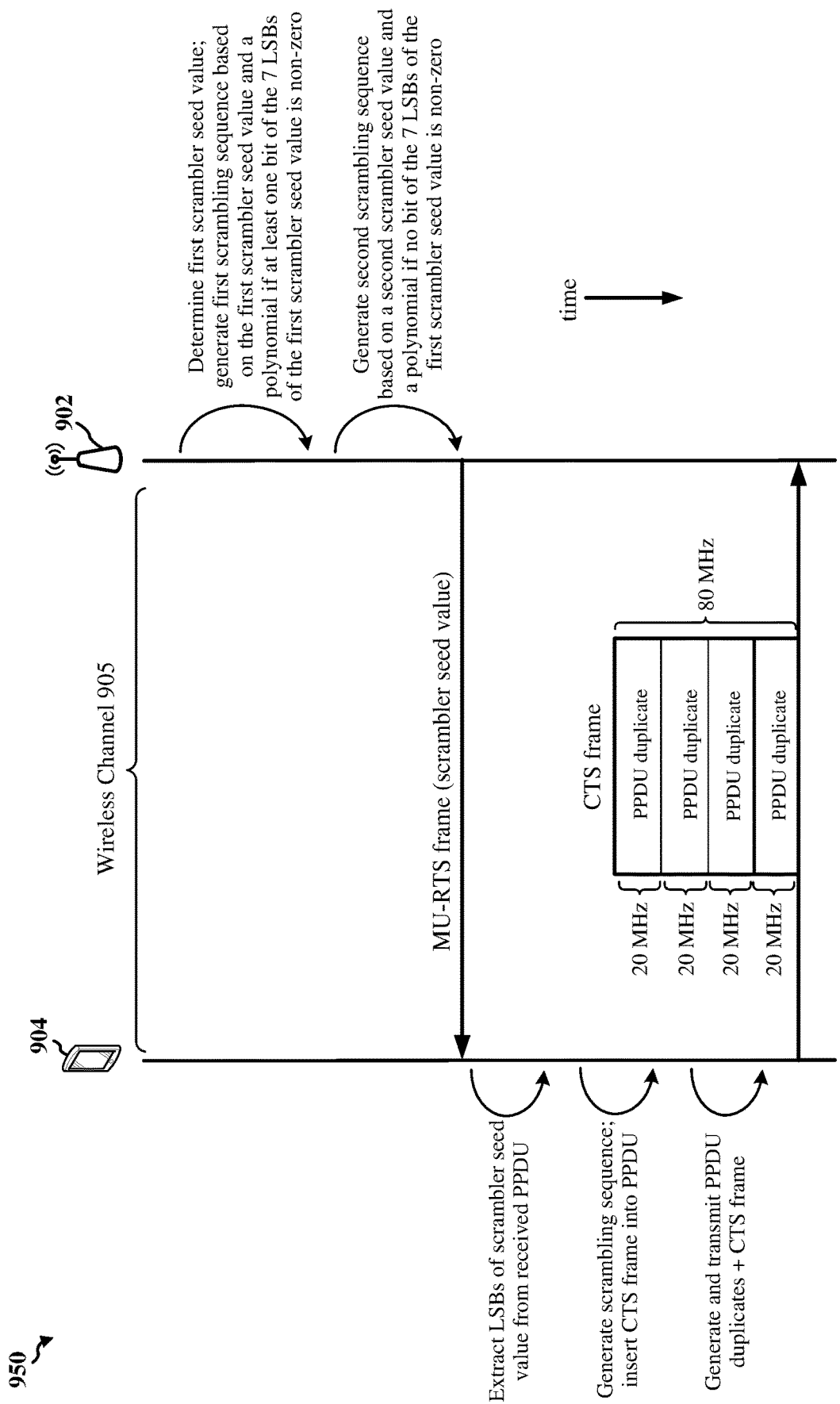

US 12,171,024 B2

SCRAMBLING SEQUENCES FOR REQUEST-TO-SEND (RTS) AND CLEAR-TO-SEND (CTS) FRAMES

CROSS-REFERENCE TO RELATED APPLICATIONS

This patent application claims priority to U.S. Provisional Patent Application No. 63/045,186 entitled "SCRAMBLING SEQUENCES FOR REQUEST-TO-SEND (RTS) AND CLEAR-TO-SEND (CTS) FRAMES" and filed on Jun. 28, 2020, which is assigned to the assignee hereof. The disclosures of all prior applications are considered part of and are incorporated by reference in this patent application.

TECHNICAL FIELD

This disclosure relates generally to wireless communication, and more specifically, to scrambling wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Wireless communication devices operating in a wireless network or system (such as a WLAN) may scramble wireless transmissions to one another using a scrambling sequence to increase the randomness of data transmitted over a wireless medium. Scrambling sequences may also be used to randomize persistent interference between wireless signals transmitted by different wireless communication devices. Transmissions of random data typically have a lower peak-to-average power ratio (PAPR) than transmissions of non-random data. As such, increasing the randomness of data transmitted over the wireless medium can reduce the PAPR of such data transmissions.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a transmitting device, and may include determining a scrambler seed value that includes at least 11 bits, where at least one of the 7 least significant bits (LSBs) of the scrambler seed value has a non-zero value. The method may include generating a scrambling sequence based on the scrambler seed value and a polynomial. The method may include constructing a physical layer convergence protocol (PLCP) protocol data unit (PPDU) that includes a multi-user (MU) request-to-send (RTS) frame and the scrambler seed value. The method may include scrambling one or more portions of the PPDU based on the scrambling sequence. The method may include transmitting the PPDU over a wireless medium. In some implementations, the configuration of the scrambler seed value may be specified by the Institute of Electrical and Electronics Engineers (IEEE) 802.11be amendment or later versions of the IEEE family of wireless communication standards. In some instances, the scrambler seed value consists of 11 bits, and the polynomial is $x^{11}+x^9+1$.

In some implementations, the PPDU may be an extremely high throughput (EHT) PPDU, and the entirety of the scrambler seed value may be carried in a Scrambler Initialization field of a Service field of the EHT PPDU. In some other implementations, the PPDU may be a high efficiency (HE) PPDU, a first portion of the scrambler seed value may be carried in a Scrambler Initialization field of a Service field of the HE PPDU, and a second portion of the scrambler seed value may be carried in one or more reserved service bits of the Service field of the HE PPDU. In some instances, the first portion of the scrambler seed value consists of 7 bits, and the second portion of the scrambler seed value consists of 4 bits.

In some implementations, the MU RTS frame may be a trigger frame, and the method may also include receiving a clear-to-send (CTS) frame from one or more receiving devices triggered by the MU RTS frame. In some instances, a frequency bandwidth spanned by the PPDU carrying the MU RTS frame includes a plurality of 20 MHz frequency subbands. The CTS frame may be carried in a plurality of non-high throughput (non-HT) PPDU duplicates received over a plurality of respective 20 MHz frequency subbands.

In some implementations, determining the scrambler seed value includes determining a first scrambler seed value, and determining whether at least one bit of the 7 LSBs of the first scrambler seed value has a non-zero value. In some instances, the method may also include using the first scrambler seed value as the scrambler seed value in response to determining that at least one bit of the 7 LSBs of the first scrambler seed value has a non-zero value. In some other instances, the method may also include generating, in response to determining that no bit of the 7 LSBs of the first scrambler seed value has a non-zero value, a second scrambler seed value that includes at least 11 bits.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. In some implementations, the at least one memory may store processor-readable code that, when executed by the at least one processor in conjunction with the at least one modem, is configured to determine a scrambler seed value that includes at least 11 bits, where at least one of the 7 LSBs of the scrambler seed value has a non-zero value. Execution of the processor-readable code may be configured to generate a scrambling sequence based on the scrambler seed value and a polynomial. Execution of the processor-readable code may be configured to construct a PPDU that includes an MU RTS frame and the scrambler seed value. Execution of the processor-readable code may be configured to scramble one or more portions of the PPDU based on the scrambling sequence. Execution of the processor-readable code may be configured to transmit the PPDU over a wireless medium. In some implementations, the configuration of the scrambler seed value may be specified by the IEEE 802.11be amendment or later versions of the IEEE family of wireless communication standards. In some instances, the scrambler seed value consists of 11 bits, and the polynomial is $x^{11}+x^9+1$.

In some implementations, the PPDU may be an EHT PPDU, and the entirety of the scrambler seed value may be carried in a Scrambler Initialization field of a Service field of the EHT PPDU. In some other implementations, the PPDU may be an HE PPDU, a first portion of the scrambler seed value may be carried in a Scrambler Initialization field of a Service field of the HE PPDU, and a second portion of the scrambler seed value may be carried in one or more reserved service bits of the Service field of the HE PPDU. In some instances, the first portion of the scrambler seed value consists of 7 bits, and the second portion of the scrambler seed value consists of 4 bits.

In some implementations, the MU RTS frame may be a trigger frame, and execution of the processor-readable code may be configured to receive a CTS frame from one or more receiving devices triggered by the MU RTS frame. In some instances, a frequency bandwidth spanned by the PPDU carrying the MU RTS frame includes a plurality of 20 MHz frequency subbands. The CTS frame may be carried in a plurality of non-HT PPDU duplicates received over a plurality of respective 20 MHz frequency subbands.

In some implementations, execution of the processor-readable code may be configured to determine whether the at least one bit of the 7 LSBs of the scrambler seed value has a non-zero value. Execution of the processor-readable code may be configured to generate another scrambler seed value that includes at least 11 bits responsive to determining that no bit of the 7 LSBs of the scrambler seed value has a non-zero value.

In some implementations, determining the scrambler seed value may include determining a first scrambler seed value, and determining whether at least one bit of the 7 LSBs of the first scrambler seed value has a non-zero value. In some instances, execution of the processor-readable code may cause the transmitting device to use the first scrambler seed value as the scrambler seed value in response to determining that at least one bit of the 7 LSBs of the first scrambler seed value has a non-zero value. In some other instances, execution of the processor-readable code may cause the transmitting device to generate a second scrambler seed value that includes at least 11 bits in response to determining that no bit of the 7 LSBs of the first scrambler seed value has a non-zero value.

Another innovative aspect of the subject matter described in this disclosure can be implemented as a method of wireless communication. The method may be performed by a receiving device, and may include receiving, over a wireless medium, a first physical layer convergence protocol (PLCP) protocol data unit (PPDU) that includes an MU RTS frame and a scrambler seed value. The method may include extracting a plurality of LSBs of the scrambler seed value. The method may include generating a scrambling sequence based on the plurality of LSBs of the received scrambler seed value and a polynomial based on at least one bit of the plurality of LSB's of the scrambler seed value having a non-zero value. The method may include constructing a second PPDU that includes a CTS frame. The method may include scrambling one or more portions of the second PPDU based on the scrambling sequence. The method may include transmitting a plurality of PPDU duplicates of the scrambled second PPDU over the wireless medium, each PPDU duplicate of the plurality of PPDU duplicates carrying the CTS frame.

In some implementations, a frequency bandwidth spanned by the first PPDU may include a plurality of 20 MHz frequency subbands, and each PPDU duplicate of the plurality of PPDU duplicates may be transmitted on a corresponding 20 MHz frequency subband of the plurality of 20 MHz frequency subbands.

In various implementations, the configuration of the scrambler seed value may be specified by the IEEE 802.11be amendment or later versions of the IEEE family of wireless communication standards. In some implementations, the scrambler seed value consists of 11 bits, and the polynomial is $x^{11}+x^9+1$. In some instances, at least one bit of the plurality of LSBs of the received scrambler seed value may have a non-zero value, and the plurality of LSBs may consist of the 7 LSBs of the received scrambler seed value. In some other instances, the second PPDU includes a Service field that carries the 7 LSBs of the received scrambler seed value.

In some implementations, generating the scrambling sequence includes selecting a configured scrambler seed value in response to determining that each bit of the one or more LSBs of the received scrambler seed value has a zero value. Generating the scrambling sequence may also include generating the scrambling sequence based on the configured scrambler seed value and the polynomial. The configured scrambler seed value may consist of 7 bits and may be specified by the IEEE 802.11be amendment or later versions of the IEEE family of wireless communication standards. In some instances, the configured scrambler seed value may be one of "0000001" or "1111111." In some other implementations, generating the scrambling sequence includes modifying the extracted LSBs of the received scrambler seed value by replacing at least one of the extracted LSBs with a non-zero value in response to determining that each bit of the plurality of LSBs of the received scrambler seed value has a zero value. Generating the scrambling sequence may also include generating the scrambling sequence based on the modified extracted LSBs and the polynomial.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. In some implementations, the at least one memory may store processor-readable code that, when executed by the at least one processor in conjunction with the at least one modem, is configured to receive, over a wireless medium, a first physical layer convergence protocol (PLCP) protocol data unit (PPDU) that includes an MU RTS frame and a scrambler seed value. Execution of the processor-readable code may cause the wireless communication device to extract a plurality of least significant bits (LSBs) of the scrambler seed value. Execution of the processor-readable code may be configured to generate a scrambling sequence based on the plurality of LSBs of the received scrambler seed value and a polynomial based on at least one bit of the plurality of LSB's of the scrambler seed value having a non-zero value. Execution of the processor-readable code may cause the wireless communication device to construct a second PPDU that includes a CTS frame, and to scramble one or more portions of the second PPDU based on the scrambling sequence. Execution of the processor-readable code may cause the wireless communication device to transmit a plurality of PPDU duplicates of the scrambled second PPDU over the wireless medium, each PPDU duplicate of the plurality of PPDU duplicates carrying the CTS frame. In some implementations, a frequency bandwidth spanned by the first PPDU may include a plurality of 20 MHz frequency subbands, and each PPDU duplicate of the plurality of PPDU duplicates may be transmitted on a corresponding 20 MHz frequency subband of the plurality of 20 MHz frequency subbands.

In various implementations, the configuration of the scrambler seed value may be specified by the IEEE 802.11be amendment or later versions of the IEEE family of wireless communication standards. In some implementations, the scrambler seed value consists of 11 bits, and the polynomial is $x^{11}+x^9+1$. In some instances, at least one bit of the plurality of LSBs of the received scrambler seed value may have a non-zero value, and the plurality of LSBs may consist of the 7 LSBs of the received scrambler seed value. In some other instances, the second PPDU includes a Service field that carries the 7 LSBs of the received scrambler seed value.

In some implementations, generating the scrambling sequence includes selecting a configured scrambler seed value in response to determining that each bit of the one or more LSBs of the received scrambler seed value has a zero value. Generating the scrambling sequence may also include generating the scrambling sequence based on the configured scrambler seed value and the polynomial. The configured scrambler seed value may consist of 7 bits and may be specified by the IEEE 802.11be amendment or later versions of the IEEE family of wireless communication standards. In some instances, the configured scrambler seed value may be one of "0000001" or "1111111." In some other implementations, generating the scrambling sequence includes modifying the extracted LSBs of the received scrambler seed value by replacing at least one of the extracted LSBs with a non-zero value in response to determining that each bit of the plurality of LSBs of the received scrambler seed value has a zero value. Generating the scrambling sequence may also include generating the scrambling sequence based on the modified extracted LSBs and the polynomial.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 9B shows a sequence diagram of an example wireless communication between a transmitting device and one or more receiving devices according to some other implementations.

DETAILED DESCRIPTION

Figure 1:
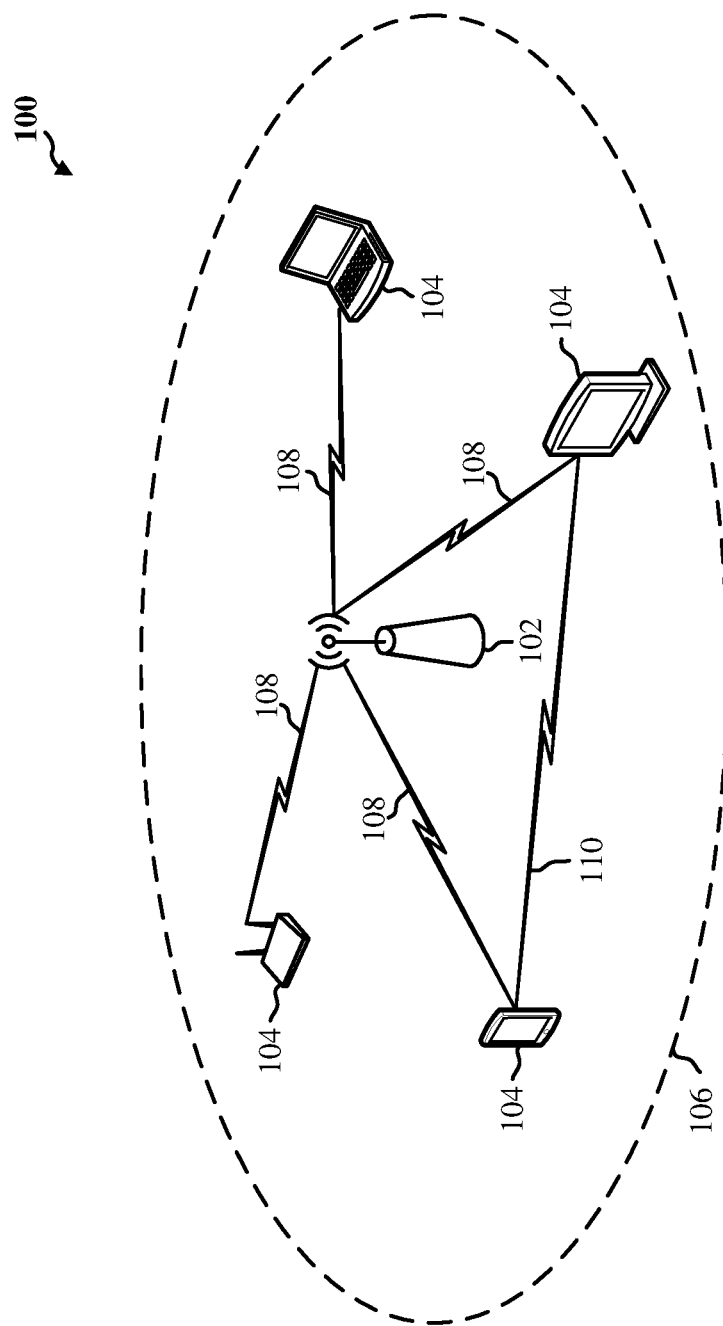
FIG. 1 shows a pictorial diagram of an example wireless communication network.

Like reference numbers and designations in the various drawings indicate like elements.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to scrambling data for transmission over a wireless medium. Some implementations more specifically relate to scrambling communications between wireless communication devices that may operate according to one or more next versions of the Institute of Electrical and Electronics Engineers (IEEE) 802.11 family of wireless communication standards. In some implementations, a wireless communication device operating as a transmitting device may determine a scrambler seed value that includes at least 11 bits, and may generate a scrambling sequence based on the scrambler seed value and a polynomial. The transmitting device may construct a physical layer convergence protocol (PLCP) protocol data unit (PPDU) that includes a multi-user (MU) request-to-send (RTS) frame and the scrambler seed value. In some instances, the scrambler seed value consists of 11 bits, and the polynomial may be expressed as $(Sx)=x^{11}+x^9+1$. After scrambling one or more portions of the PPDU based on the scrambling sequence, the transmitting device may transmit the scrambled PPDU carrying the MU-RTS frame and the scrambler seed value over a wireless channel to a receiving device.

In some instances, the PPDU may be an extremely high throughput (EHT) PPDU, and the entirety of the scrambler seed value may be carried in a Scrambler Initialization field of a Service field of the EHT PPDU. For example, an 11-bit scrambler seed value may be carried in the 11-bit Scrambler Initialization field of a Service field of EHT PPDUs. In some other instances, the PPDU may be a high efficiency (HE) PPDU for which the Scrambler Initialization field includes 7 bits. As such, a first portion of the scrambler seed value may be carried in the Scrambler Initialization field of the Service field of the HE PPDU, and a second portion of the scrambler seed value may be carried in one or more reserved service bits of the Service field of the HE PPDU. For example, the first 7 bits of an 11-bit scrambler seed value may be carried in the 7-bit Scrambler Initialization field of the Service field of the HE PPDU, and the remaining 4 bits of the 11-bit scrambler seed value may be carried in 4 corresponding reserved service bits of the Service field of the HE PPDU.

The receiving device obtains the MU-RTS frame carried in the PPDU, and may determine the scrambler seed value carried in or indicated by the MU-RTS frame. In some implementations, the receiving device extracts a plurality of LSBs of the scrambler seed value, and generates a scrambling sequence based on the plurality of LSBs of the scrambler seed value and a polynomial based on at least one bit of the plurality of LSBs of the scrambler seed value having a non-zero value. The receiving device may then construct a second PPDU that includes a clear-to-send (CTS) frame, and may scramble one or more portions of the second PPDU based on the scrambling sequence. The receiving device may transmit a plurality of PPDU duplicates of the scrambled second PPDU over the wireless channel, where each of the PPDU duplicates carries the CTS frame. In some instances, each PPDU duplicate is transmitted on a 20 MHz frequency subband, and the resulting PPDU transmission spans an 80 MHz bandwidth.

In some implementations for which the PPDU received from the transmitting device is an HE PPDU, the receiving device may extract the 7 LSBs of the scrambler seed value by copying the 7-bit legacy portion of the Scrambler Initialization field of a Service field of the HE PPDU. In this way, the receiving device may use the same scrambler seed value to generate the scrambling sequence as the scrambler seed value used by the transmitting device to determine the scrambler seed value. In other implementations for which the PPDU received from the transmitting device is an EHT PPDU, the receiving device may extract some or all of the scrambler seed value carried in the Scrambler Initialization field of the EHT PPDU's Service field.

Although at least one bit of the plurality of LSBs of the scrambler seed value determined by the transmitting device is to have a non-zero value, it may be possible for no bit of the plurality of LSBs of the scrambler seed value to have a non-zero value (such that each of the plurality of LSBs of the scrambler seed value equals zero). As such, in some implementations, the transmitting device may determine a first scrambler seed value, and may determine whether at least one bit of the plurality of LSBs of the first scrambler seed value has a non-zero value. If at least one bit of the plurality of LSBs of the first scrambler seed value has a non-zero value, then the transmitting device generates a first scrambling sequence based on the first scrambler seed value and a polynomial. The transmitting device may use the first scrambling sequence to scramble wireless communications transmitted to other wireless communication devices.

Conversely, if no bit of the plurality of LSBs of the first scrambler seed value has a non-zero value, then the transmitting device generates a second scrambler seed value that includes at least 11 bits. The transmitting device determines whether at least one bit of the plurality of LSBs of the second scrambler seed value has a non-zero value, and if so, generates a second scrambling sequence based on the second scrambler seed value and the polynomial. The transmitting device may use the second scrambling sequence to scramble wireless communications transmitted to other wireless communication devices.

Particular implementations of the subject matter described in this disclosure can be implemented to realize one or more of the following potential advantages. In some implementations, a transmitting device may use a longer scrambling sequence generated by a higher-order polynomial to scramble data for transmission to a receiving device. That is, while legacy wireless communication devices typically use a 127-bit scrambling sequence based on a $7^{th}$ order polynomial $S(x)=x^7+x^4+1$ and a 7-bit scrambling initialization code, wireless communication devices practicing aspects of the subject matter disclosed herein may use a 2047-bit scrambling sequence based on an $11^{th}$ order polynomial $S(x)=x^{11}+x^9+1$ and an 11-bit scrambling initialization code to scramble data for transmission to one or more receiving devices. In this way, by increasing the degree of randomness with which the data bits or symbols are transmitted, the described techniques can be used to further reduce the peak-to-average power ratio (PAPR) of data transmissions. In addition, by providing various mechanisms through which a transmitting device can indicate the 11-bit scrambler seed value used for scrambling transmissions to a receiving device, implementations of the subject matter disclosed herein may ensure that the receiving device is able to extract or obtain the scrambler seed value (or at least a portion of the scrambler seed value), regardless of whether the scrambled transmissions include EHT frames or HE frames.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf, in addition to further amendments). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described herein). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2A:
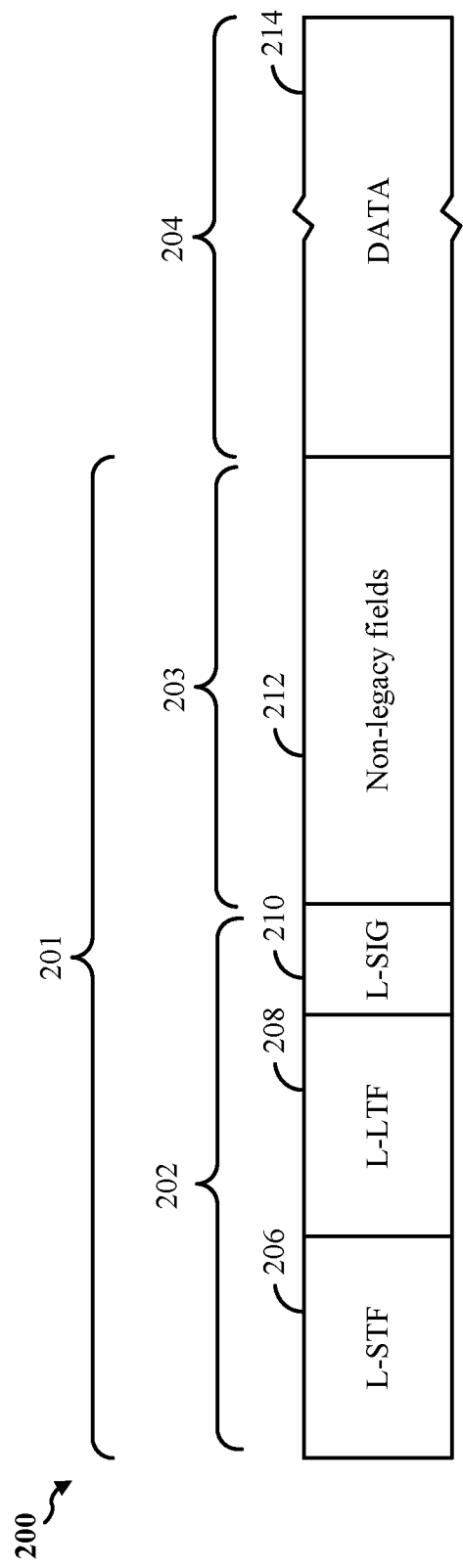
FIG. 2A shows an example protocol data unit (PDU) usable for communications between an access point (AP) and one or more stations (STAs).

FIG. 2A shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 also may include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
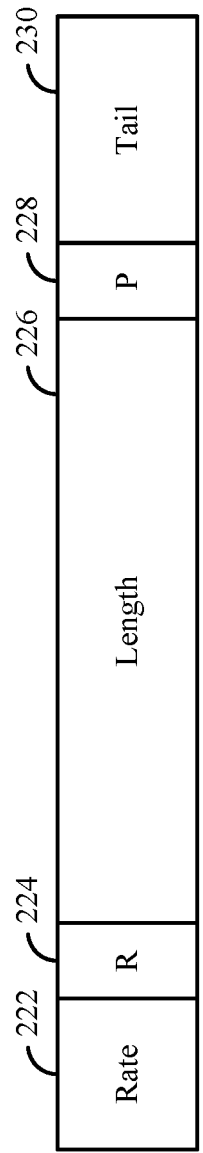
FIG. 2B shows an example field in the PDU of FIG. 2A.

FIG. 2B also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
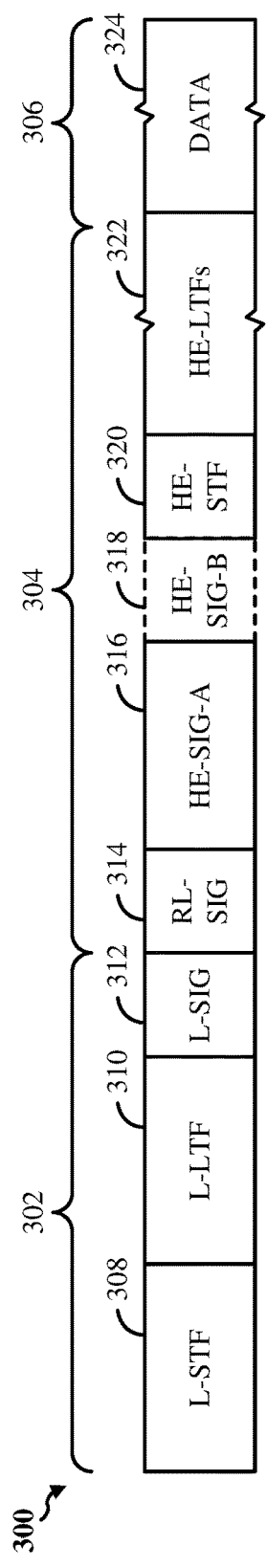
FIG. 3A shows an example PDU usable for communications between an AP and each of a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
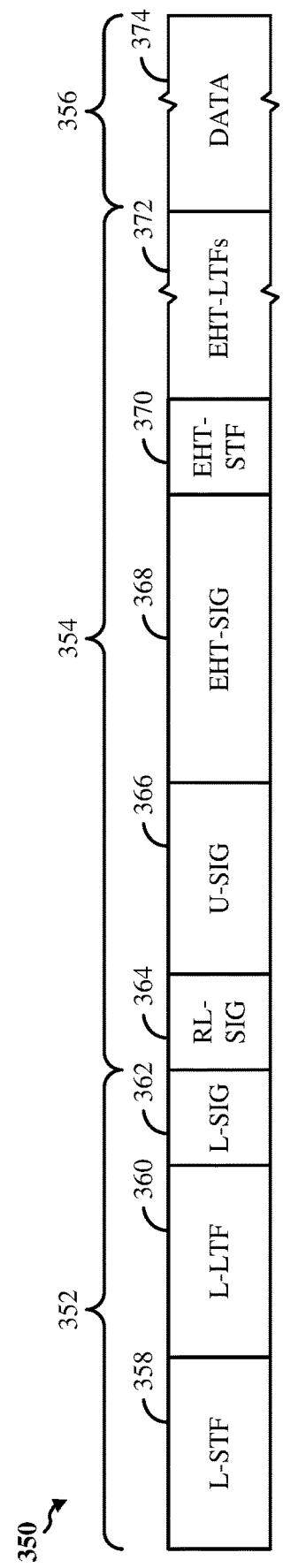
FIG. 3B shows another example PDU usable for communications between an AP and each of a number of STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
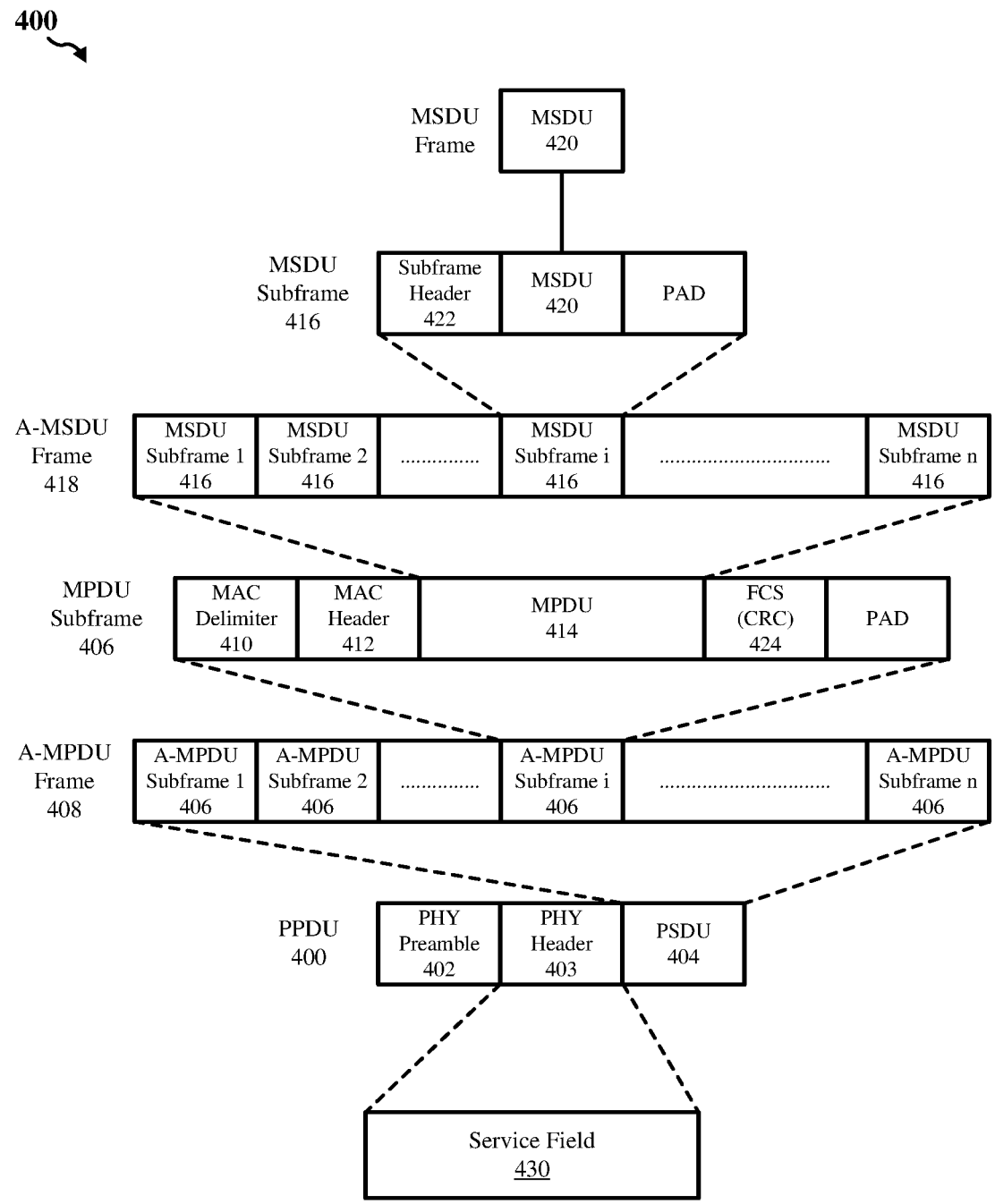
FIG. 4 shows an example physical layer convergence protocol (PLCP) protocol data unit (PPDU) usable for communications between an AP and each of a number of STAs.

FIG. 4 shows an example PPDU 400 usable for communications between an AP 102 and a number of STAs 104. As described herein, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which includes the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 424 may include a cyclic redundancy check (CRC).

As described herein, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102).

To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas also may support space—time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described herein). The $N_{SS}$ spatial streams may be mapped to a number $N_{STS}$ of space-time streams, which are mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas also may support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may generate a precoding (or "steering") matrix for the beamformee based on the feedback and use the steering matrix to precode the data streams to configure the amplitudes and phase shifts for subsequent transmissions to the beamformee.

As described herein, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 5A:
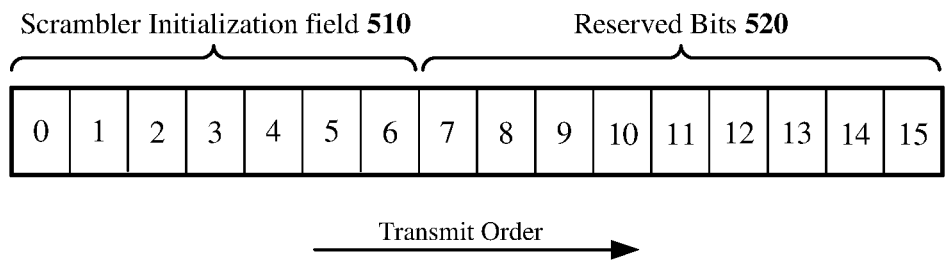
FIG. 5A shows an illustration of an example Service field of a PPDU.

FIG. 5A shows an illustration depicting an example Service field 500 of a PPDU. The service field 500, which may be one example of the Service field specified by the IEEE 802.11ax amendment to the IEEE family of wireless communication standards, carries 16 bits and includes a Scrambler Initialization field 510 and a reserved portion 520. The Scrambler Initialization field 510 includes 7 bits (bits 0-6) that can store a 7-bit scrambler seed value. The reserved portion 520 includes 9 reserved bits (bits 7-15). In some instances, the first 7 bits of a scrambler seed value can be carried in the Scrambler Initialization field 510, and additional bits of the scrambler seed value can be carried in one or more of the reserved bits of the reserved portion 520. As depicted in FIG. 5A, the 16 bits of the service field 500 are sequentially transmitted in order, with the first bit (bit 0) transmitted first and the last bit (bit 15) transmitted last.

Figure 5B:
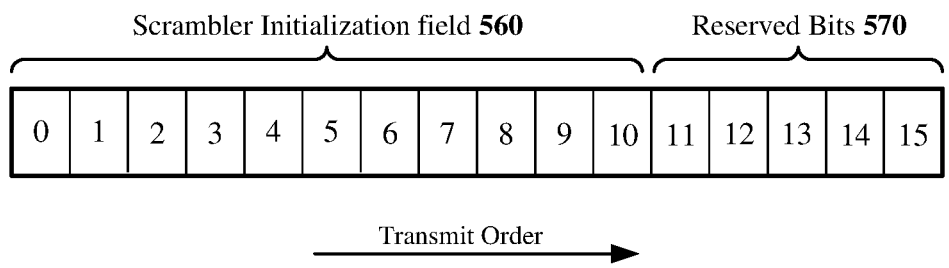
FIG. 5B shows an illustration of another example Service field of a PPDU.

FIG. 5B shows an illustration depicting another example Service field 550 of a PPDU. The Service field 550, which may be one example of the Service field specified by the IEEE 802.11be amendment or later revisions to the IEEE family of wireless communication standards, carries 16 bits and includes a Scrambler Initialization field 560 and a reserved portion 570. The Scrambler Initialization field 560 includes 11 bits (bits 0-10) that can store an 11-bit scrambler seed value. The reserved portion 570 includes 5 reserved bits (bits 11-15). In some instances, the first 11 bits of a scrambler seed value can be carried in the Scrambler Initialization field 550, and additional bits of the scrambler seed value can be carried in one or more of the reserved bits of the reserved portion 570. As depicted in FIG. 5B, the 16 bits of the service field 550 are sequentially transmitted in order, with the first bit (bit 0) transmitted first and the last bit (bit 15) transmitted last.

Figure 6:
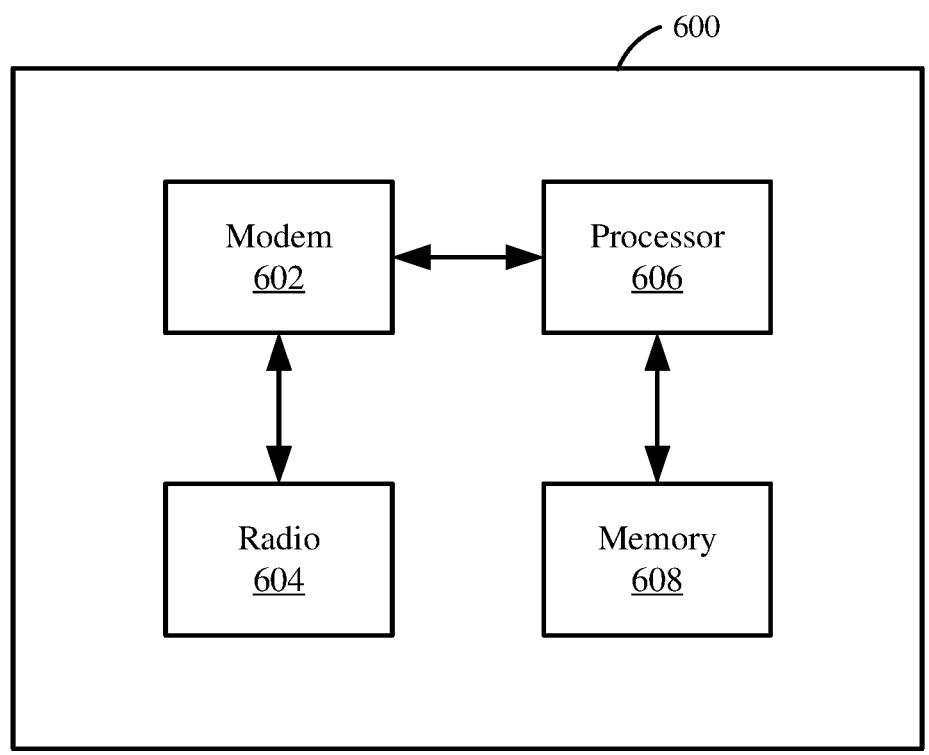
FIG. 6 shows a block diagram of an example wireless communication device.

FIG. 6 shows a block diagram of an example wireless communication device 600. In some implementations, the wireless communication device 600 can be an example of a device for use in a STA such as one of the STAs 104 described above with reference to FIG. 1. In some implementations, the wireless communication device 600 can be an example of a device for use in an AP such as the AP 102 described above with reference to FIG. 1. The wireless communication device 600 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 600 can be, or can include, a chip, system on chip (SoC), chipset, package or device that includes one or more modems 602, for example, a Wi-Fi (IEEE 802.11 compliant) modem. In some implementations, the one or more modems 602 (collectively "the modem 602") additionally include a WWAN modem (for example, a 3GPP 4G LTE or 5G compliant modem). In some implementations, the wireless communication device 600 also includes one or more radios 604 (collectively "the radio 604"). In some implementations, the wireless communication device 600 further includes one or more processors, processing blocks or processing elements 606 (collectively "the processor 606") and one or more memory blocks or elements 608 (collectively "the memory 608").

The modem 602 can include an intelligent hardware block or device such as, for example, an application-specific integrated circuit (ASIC) among other possibilities. The modem 602 is generally configured to implement a PHY layer. For example, the modem 602 is configured to modulate packets and to output the modulated packets to the radio 604 for transmission over the wireless medium. The modem 602 is similarly configured to obtain modulated packets received by the radio 604 and to demodulate the packets to provide demodulated packets. In addition to a modulator and a demodulator, the modem 602 may further include digital signal processing (DSP) circuitry, automatic gain control (AGC), a coder, a decoder, a multiplexer and a demultiplexer. For example, while in a transmission mode, data obtained from the processor 606 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 604. In implementations involving beamforming, the modulated symbols in the respective spatial streams are precoded via a steering matrix prior to their provision to the IFFT block.

While in a reception mode, digital signals received from the radio 604 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 606) for processing, evaluation or interpretation.

The radio 604 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 600 can include, or be coupled with, multiple transmit antennas (each with a corresponding transmit chain) and multiple receive antennas (each with a corresponding receive chain). The symbols output from the modem 602 are provided to the radio 604, which then transmits the symbols via the coupled antennas. Similarly, symbols received via the antennas are obtained by the radio 604, which then provides the symbols to the modem 602.

The processor 606 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 606 processes information received through the radio 604 and the modem 602, and processes information to be output through the modem 602 and the radio 604 for transmission through the wireless medium. For example, the processor 606 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 606 may generally control the modem 602 to cause the modem to perform various operations described above.

The memory 608 can include tangible storage media such as random-access memory (RAM) or read-only memory (ROM), or combinations thereof. The memory 608 also can store non-transitory processor- or computer-executable software (SW) code containing instructions that, when executed by the processor 606, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 7B:
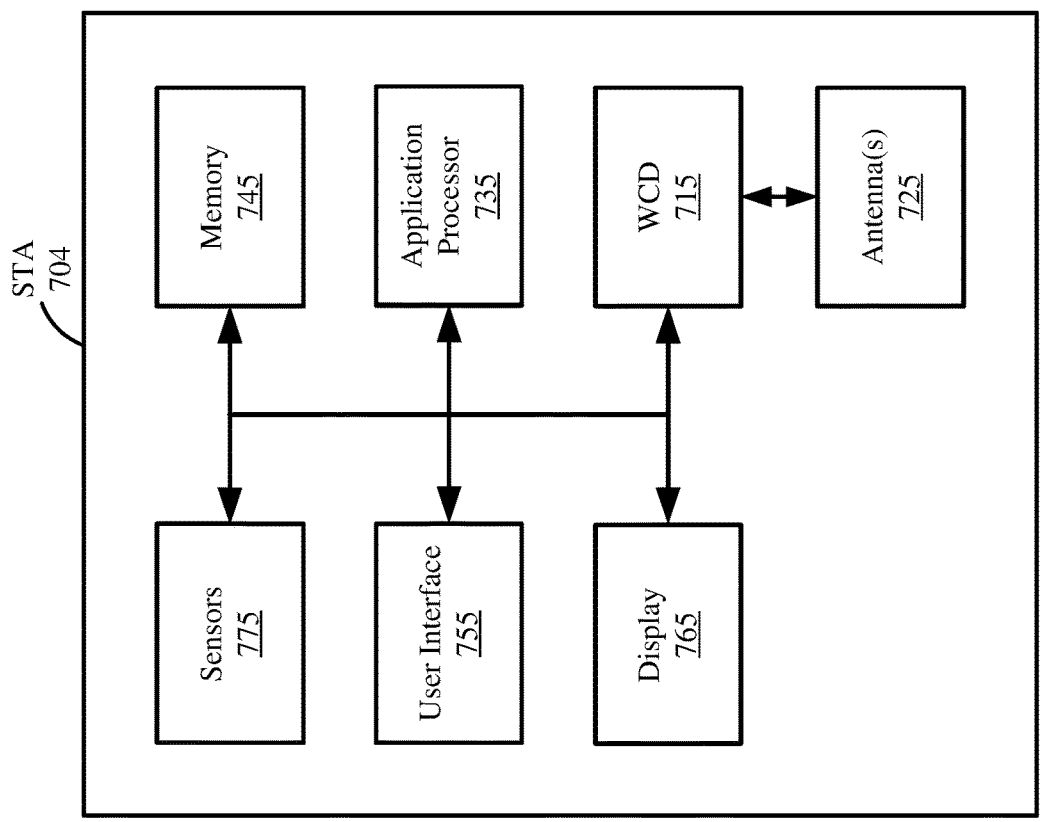
FIG. 7B shows a block diagram of an example STA.
Figure 7A:
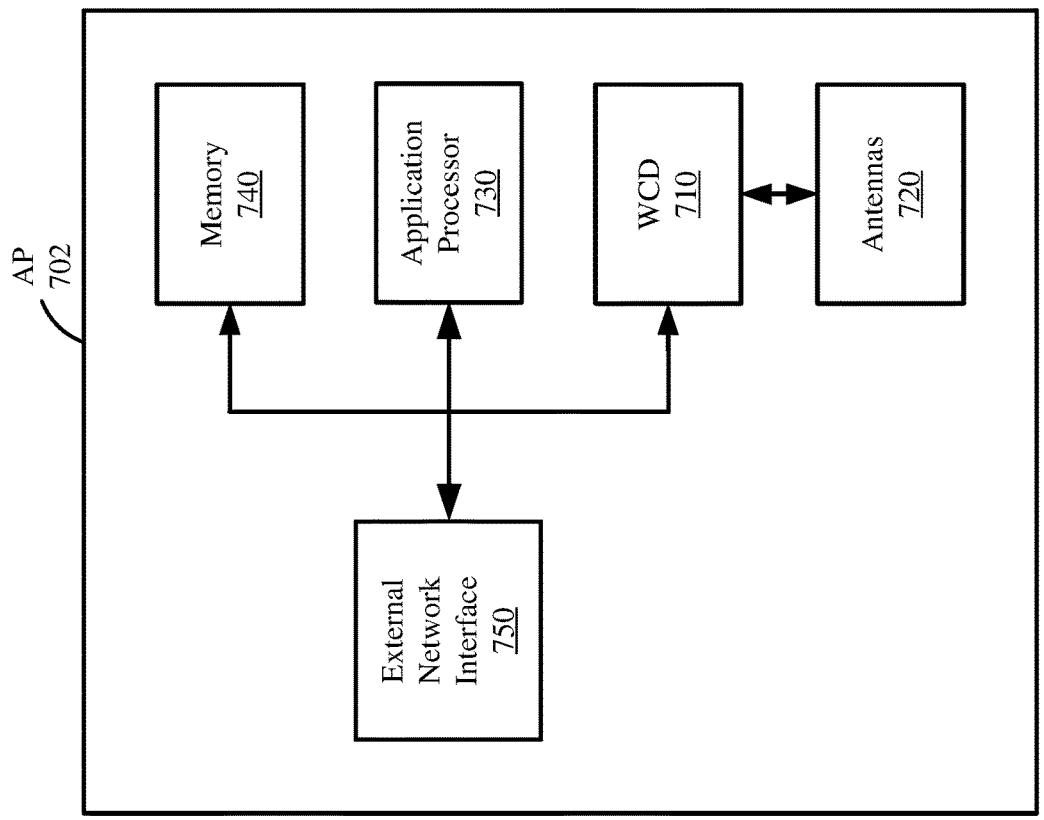
FIG. 7A shows a block diagram of an example AP.

FIG. 7A shows a block diagram of an example AP 702. For example, the AP 702 can be an example implementation of the AP 102 described with reference to FIG. 1. The AP 702 includes a wireless communication device (WCD) 710. For example, the wireless communication device 710 may be an example implementation of the wireless communication device 600 described with reference to FIG. 6. The AP 702 also includes multiple antennas 720 coupled with the wireless communication device 710 to transmit and receive wireless communications. In some implementations, the AP 702 additionally includes an application processor 730 coupled with the wireless communication device 710, and a memory 740 coupled with the application processor 730. The AP 702 further includes at least one external network interface 750 that enables the AP 702 to communicate with a core network or backhaul network to gain access to external networks including the Internet. For example, the external network interface 750 may include one or both of a wired (for example, Ethernet) network interface and a wireless network interface (such as a WWAN interface). Ones of the aforementioned components can communicate with other ones of the components directly or indirectly, over at least one bus. The AP 702 further includes a housing that encompasses the wireless communication device 710, the application processor 730, the memory 740, and at least portions of the antennas 720 and external network interface 750.

FIG. 7B shows a block diagram of an example STA 704. For example, the STA 704 can be an example implementation of the STA 104 described with reference to FIG. 1. The STA 704 includes a wireless communication device 715. For example, the wireless communication device 715 may be an example implementation of the wireless communication device 600 described with reference to FIG. 6. The STA 704 also includes one or more antennas 725 coupled with the wireless communication device 715 to transmit and receive wireless communications. The STA 704 additionally includes an application processor 735 coupled with the wireless communication device 715, and a memory 745 coupled with the application processor 735. In some implementations, the STA 704 further includes a user interface (UI) 755 (such as a touchscreen or keypad) and a display 765, which may be integrated with the UI 755 to form a touchscreen display. In some implementations, the STA 704 may further include one or more sensors 775 such as, for example, one or more inertial sensors, accelerometers, temperature sensors, pressure sensors, or altitude sensors. Ones of the aforementioned components can communicate with other ones of the components directly or indirectly, over at least one bus. The STA 704 further includes a housing that encompasses the wireless communication device 715, the application processor 735, the memory 745, and at least portions of the antennas 725, UI 755, and display 765.

Figure 8A:
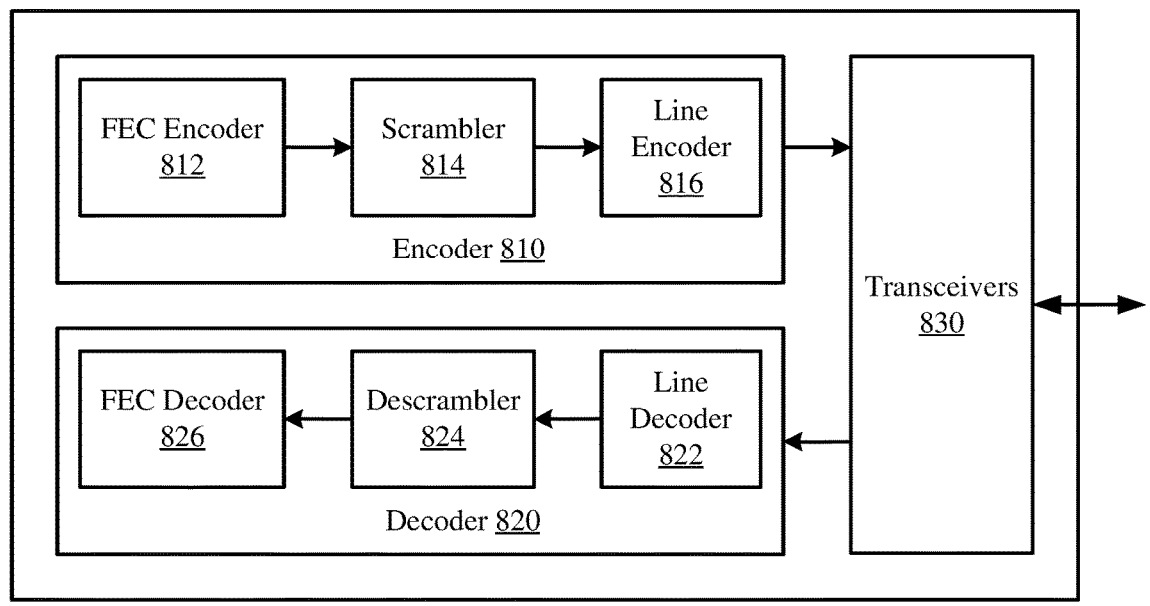
FIG. 8A shows a block diagram of an example wireless communication device according to some implementations.

FIG. 8A shows a block diagram of an example wireless communication device 800 according to some implementations. In some implementations, the wireless communication device 800 may be an AP such as the AP 102 of FIG. 1 or the AP 702 of FIG. 7A. In some other implementations, the wireless communication device 800 may be a STA such as the STA 104 of FIG. 1 or the STA 704 of FIG. 7B.

The wireless communication device 800 includes an encoder 810, a decoder 820, and a transceiver 830. The transceiver 830, which coupled between the encoder 810 and the decoder 820, may be used to transmit communications to one or more other devices on a wireless medium (not shown for simplicity), and may be used to receive communications from one or more other devices on the wireless medium. When operating as a transmitting device, the transceiver 830 outputs line-coded data symbols from the encoder 810 onto the wireless medium. When operating as a receiving device, the transceiver 830 receives line-coded data symbols from the wireless medium and forwards the received symbols to the decoder 820.

The encoder 810 encodes information bits for transmission over the wireless medium. As shown, the encoder 810 includes a forward error correction (FEC) encoder 812, a scrambler 814, and a line encoder 816. The FEC encoder 812 provides error checking and correcting capability by introducing redundancy into the bit stream. The redundant bits may provide additional information as to what the original information bits should be, and may allow a receiver to correct any errors in the received bit stream without requesting re-transmission of the entire bit stream. In some instances, the FEC encoder 812 may implement a Reed-Solomon encoding scheme. The scrambler 814 may be used to randomize information bits to reduce the frequency of long runs of ones or zeroes without introducing additional bits into the bit stream. The line encoder 816 converts the scrambled bitstream to a sequence of symbols suitable for transmission over the wireless medium. In some implementations, the line encoder 816 may implement a line coding scheme that reduces error propagation.

The decoder 820 decodes received data symbols by reversing the operations of the encoder 810. As shown, the decoder 820 includes a line decoder 822, a descrambler 824, and a FEC decoder 826. The line decoder 822 may de-map the received data symbols into a bitstream based on the line coding scheme/mapping implemented by the line encoder 816. The descrambler 824 rearranges or descrambles the bits in the bitstream based on the randomization scheme implemented by the scrambler 814. The FEC decoder 826 checks the bit stream for errors and, after correcting any errors that may have been detected, recovers the original set of information bits.

Figure 8B:
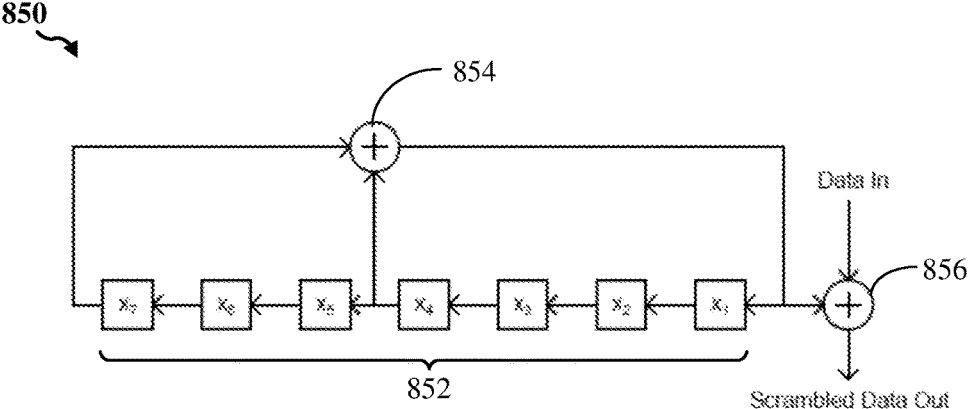
FIG. 8B shows a block diagram of an example scrambler useable for scrambling communications between wireless communication devices according to some implementations.

FIG. 8B shows a block diagram of an example scrambler 850 useable for scrambling communications between wireless communication devices according to some implementations. In some implementations, the scrambler 850 may be one example of the scrambler 814 of FIG. 8A. As shown, the scrambler 850 includes register set 852, a first summing node 854, and a second summing node 856. The scrambler 850 may be configured to scramble the contents of the data field, the PHY preamble, and the PHY header of an MPDU prior to encapsulating the MPDU into a PPDU. The contents of the data field, the PHY preamble, and the PHY header of the MPDU may be serialized and mixed with a scrambling sequence to randomize the data, for example, to reduce the PAPR of PPDU transmissions. Typically, a 7-bit pseudorandom non-zero sequence is provided as a scrambler seed value and used to seed the scrambler 850 to an initial state. Once seeded, the scrambler 850 may generate a 127-bit scrambling sequence that is used to scramble the PHY preamble, the PHY header, and the data contained in the MPDU. For example, the 127-bit scrambling sequence may be generated based on the expression $S(x)=x^7+x^4+1$, which is a $7^{th}$ order polynomial, and the 7-bit scrambler seed value may be transmitted to a receiving device in a Service field of a Data field of the PPDU. The receiving device uses the 7-bit scrambler seed value provided in the service field of the PHY header to initialize its descrambler, for example, so that the descrambler in the receiving device is synchronized with the scrambler in the transmitting device.

In some other implementations, an 11-bit pseudorandom non-zero sequence may be provided as the scrambler seed value and used to seed the scrambler 850 to an initial state. Once seeded, the scrambler 850 may generate the scrambling sequence that is used to scramble the PHY preamble, the PHY header, and the data contained in the MPDU. For example, the 127-bit scrambling sequence may be generated based on the expression $S(x)=x^{11}+x^9+1$, which is an $11^{th}$ order polynomial, and the 11-bit scrambler seed value may be transmitted to a receiving device in the Service field of the Data field of the PPDU. In instances for which the PPDU carries an MU-RTS that triggers one or more receiving devices to transmit CTS frames, a respective receiving device may extract the 7 LSBs of the scrambler seed value provided in the PPDU, and use the extracted 7 LSBs as a scrambler seed value for scrambling one or more portions of a second PPDU that carries the CTS frame.

In some instances, the pilot polarity sequence may be generated by the data scrambler. In some instance, there is no change to pilot polarity sequence (such that the same scrambler may be used for pilot polarity). In some other instances, the pilot polarity sequence may be generated by the new data scrambler, with a fixed initial state, e.g., all 1's initial state.

Figure 9A:
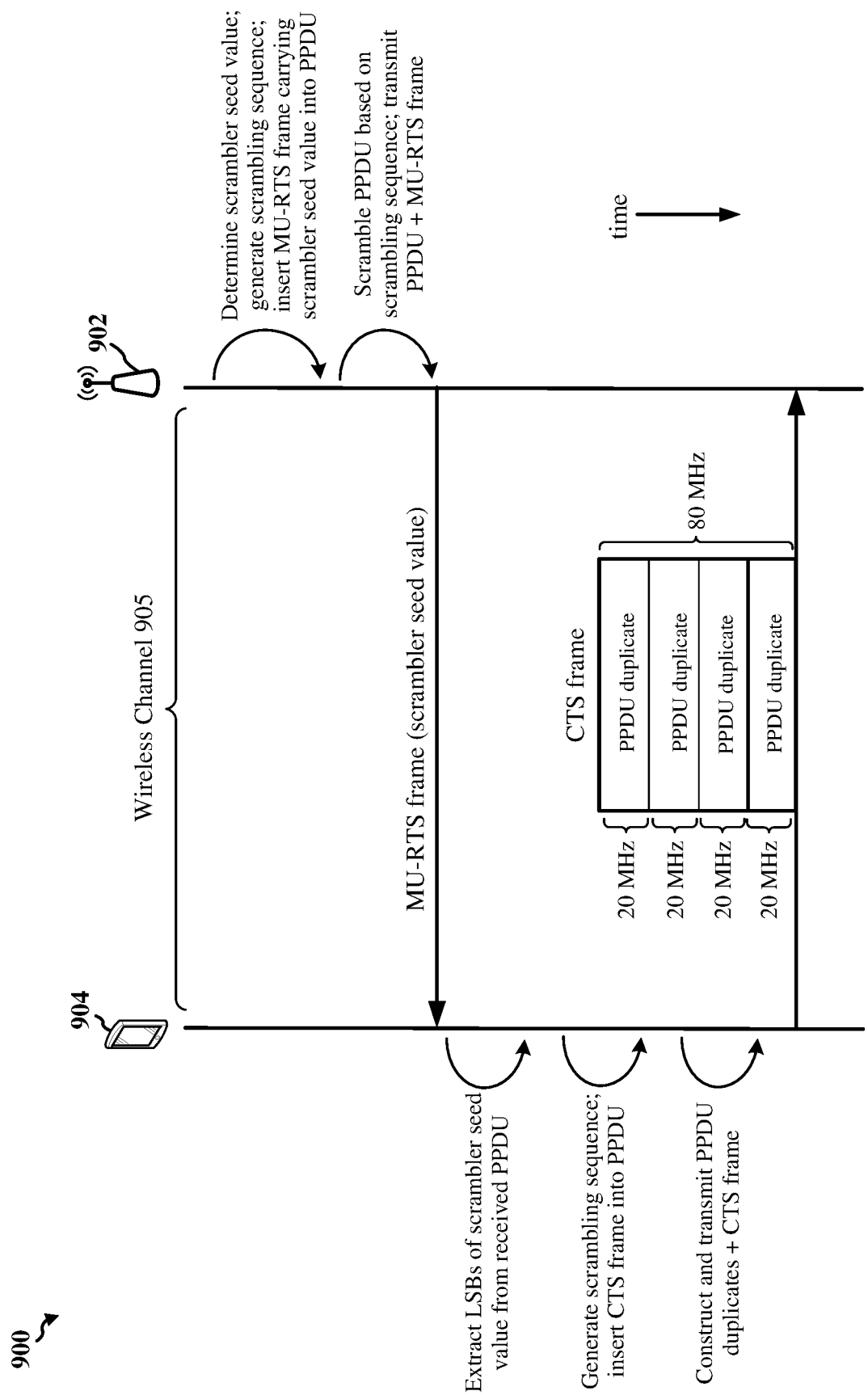
FIG. 9A shows a sequence diagram of an example wireless communication between a transmitting device and one or more receiving devices according to some implementations.

FIG. 9A shows a sequence diagram of an example communication 900 that supports exchanging MU-RTS and CTS frames between wireless communication devices. In some implementations, the communication 900 may be performed between an AP 902 and one or more STAs 904 (only one STA is shown in FIG. 9A for simplicity). The AP 902 may be an example of the AP 102 of FIG. 1 or the AP 702 of FIG. 7A, and the STA 904 may be an example of the STA 104 of FIG. 1 or the STA 704 of FIG. 7B. In other implementations, the communication 900 may be performed between two APs. In some other implementations, the communication 900 may be performed between two STAs.

The AP 902 may determine a scrambler seed value that includes at least 11 bits, and may generate a scrambling sequence based on the scrambler seed value and a polynomial. The AP 902 may construct a PPDU that includes an MU-RTS frame and an entirety of the scrambler seed value. In some implementations, the scrambler seed value consists of 11 bits, and the polynomial $(Sx)=x^{11}+x^9+1$. In some instances, the PPDU is an EHT PPDU, and the entirety of the scrambler seed value is carried in the first 11 LSBs of a Scrambler Initialization field of a Service field of the EHT PPDU. In some other instances, the PPDU is a HE PPDU, a first portion of the scrambler seed value is carried in a Scrambler Initialization field of a Service field of the HE PPDU, and a second portion of the scrambler seed value is carried in one or more reserved service bits of the Service field of the HE PPDU.

The AP 902 may scramble one or more portions of the PPDU based on the scrambling sequence, and may transmit the PPDU over a wireless channel 905. The wireless channel 905 may span a frequency bandwidth that includes any suitable numbers of wireless subchannels of various bandwidths.

The STA 904 receives the MU-RTS frame carried in the PPDU transmitted from the AP 902, and extracts a plurality of LSBs of the scrambler seed value carried in the received PPDU. The STA 904 may determine whether at least one bit of the plurality of LSB's of the scrambler seed value has a non-zero value, and may generate a scrambling sequence based on the plurality of LSBs of the scrambler seed value and a polynomial in response to determining that at least one bit of the plurality of LSB's of the scrambler seed value has a non-zero value. The scrambling sequence used by the STA 904 to transmit the second PPDU over the wireless channel 905 is the same as the scrambling sequence used by the AP 902 to transmit the first PPDU over the wireless channel 905.

The STA 904 constructs or generates a second PPDU that includes a clear-to-send (CTS) frame, scrambles one or more portions of the second PPDU based on the scrambling sequence, and generates a plurality of PPDU duplicates based on duplication of the scrambled second PPDU. The STA 904 may transmit the plurality of PPDU duplicates over the wireless channel, where each PPDU duplicate of the plurality of PPDU duplicates carries the CTS frame. As shown, each PPDU duplicate is transmitted on a 20 MHz frequency subband, and the resulting PPDU transmission spans an 80 MHz bandwidth. The AP 902 receives the PPDU duplicates spanning the 80 MHz bandwidth.

FIG. 9B shows a sequence diagram of another example communication 950 that supports exchanging MU RTS and CTS frames between wireless communication devices. In some implementations, the communication 950 may be performed between the AP 902 and one or more STAs 904 (only one STA is shown in FIG. 9B for simplicity). The AP 902 may be an example of the AP 102 of FIG. 1 or the AP 702 of FIG. 7A, and the STA 904 may be an example of the STA 104 of FIG. 1 or the STA 704 of FIG. 7B. In other implementations, the communication 950 may be performed between two APs. In some other implementations, the communication 950 may be performed between two STAs.

The AP 902 may determine a first scrambler seed value that includes at least 11 bits, and may determine whether at least one bit of the 7 least significant bits (LSBs) of the first scrambler seed value has a non-zero value. If the AP 902 determines that at least one bit of the 7 LSBs of the first scrambler seed value has a non-zero value, then the AP 902 generates a first scrambling sequence based on the first scrambler seed value and a polynomial. The AP 902 constructs or generates a first PPDU that includes an MU-RTS frame and the first scrambler seed value. The AP 902 scrambles one or more portions of the first PPDU based on the first scrambling sequence. The AP 904 transmits the first PPDU over the wireless channel 905 to the one or more STAs 904.

Conversely, if the AP 902 determines that no bit of the 7 LSBs of the first scrambler seed value has a non-zero value, then the AP 902 generates a second scrambler seed value that includes at least 11 bits. The AP 902 determines whether at least one bit of the 7 LSBs of the second scrambler seed value has a non-zero value, and if so, the AP 902 generates a second scrambling sequence based on the second scrambler seed value and the polynomial. The AP 902 constructs or generates a second PPDU that includes the MU-RTS frame and the second scrambler seed value. The AP 902 scrambles one or more portions of the second PPDU based on the second scrambling sequence, and transmits the second PPDU over the wireless channel 905.

The STA 904 receives the MU-RTS frame carried in the PPDU transmitted from the AP 902, and extracts a plurality of LSBs of the scrambler seed value carried in the received PPDU. The STA 904 may determine whether at least one bit of the plurality of LSB's of the scrambler seed value has a non-zero value, and may generate a scrambling sequence based on the plurality of LSBs of the scrambler seed value and a polynomial in response to determining that at least one bit of the plurality of LSB's of the scrambler seed value has a non-zero value.

The STA 904 constructs or generates a PPDU that includes a clear-to-send (CTS) frame, and scrambles one or more portions of the PPDU based on the scrambling sequence. The STA 904 may transmit a plurality of PPDU duplicates of the scrambled PPDU over the wireless channel 905, where each PPDU duplicate of the plurality of PPDU duplicates carries the CTS frame. As shown, each PPDU duplicate is transmitted over a 20 MHz frequency subband, and the resulting PPDU transmission spans an 80 MHz bandwidth. The AP 902 receives the PPDU duplicates spanning the 80 MHz bandwidth.

Figure 10:
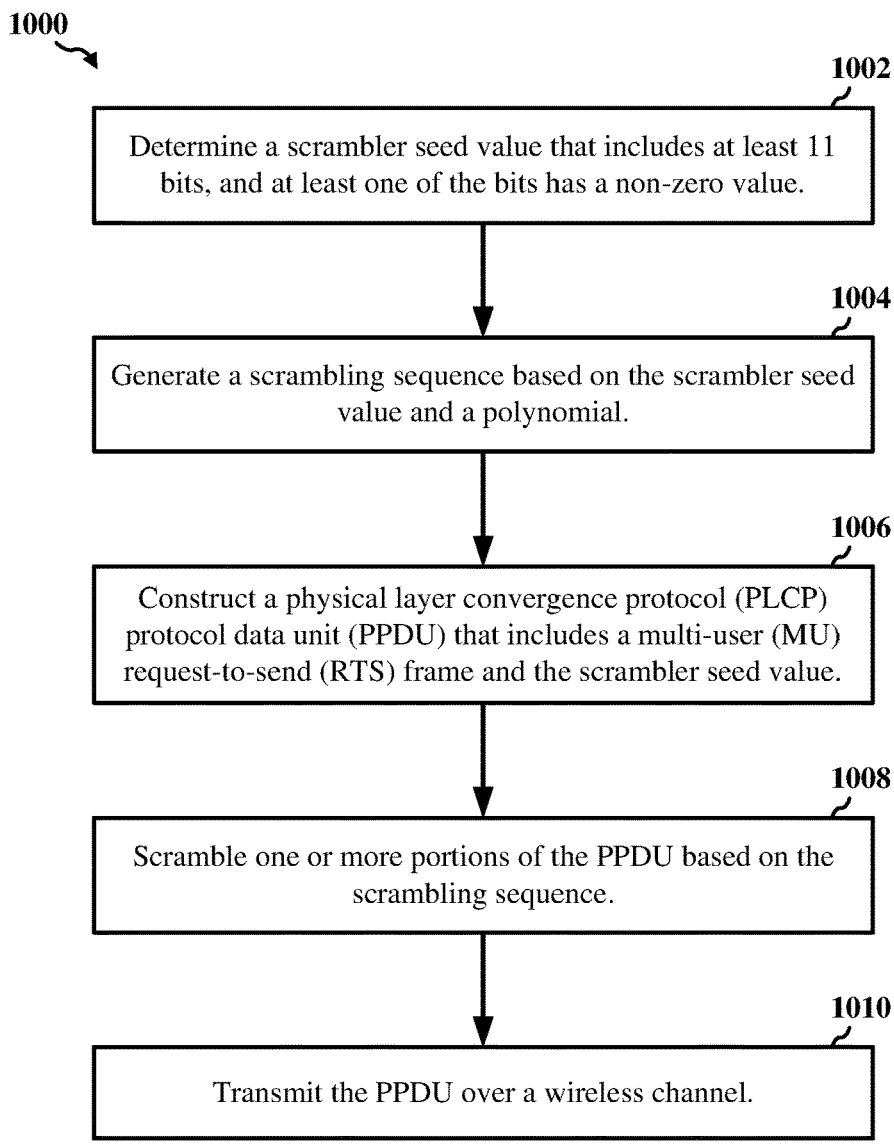
FIG. 10 shows a flowchart illustrating an example process for wireless communication by a transmitting device that supports scrambling wireless communications according to some implementations.

FIG. 10 shows a flowchart illustrating an example process 1000 for wireless communication by a transmitting device that supports scrambling wireless communications. In some implementations, the process 1000 may be performed by a wireless communication device operating as or within an AP, such as one of the APs 102 or 702 described above with reference to FIGS. 1 and 7A, respectively. In some other implementations, the process 1000 may be performed by a wireless communication device operating as or within a network node, such as one of the STAs 104 or 704 described above with reference to FIGS. 1 and 7B, respectively.

In some implementations, the process 1000 begins at block 1002 with determining a scrambler seed value that includes at least 11 bits. The process 1000 proceeds at block 1004 with generating a scrambling sequence based on the scrambler seed value and a polynomial. The process 1000 proceeds at block 1006 with constructing a physical layer convergence protocol (PLCP) protocol data unit (PPDU) that includes a multi-user (MU) request-to-send (RTS) frame and the scrambler seed value. The process 1000 proceeds at block 1008 with scrambling one or more portions of the PPDU based on the scrambling sequence. The process 1000 proceeds at block 1010 with transmitting the PPDU over a wireless channel.

The scrambler seed value may be of any suitable length, and may be generated using any suitable random number generator or pseudorandom number generator. In some implementations, the configuration of the scrambler seed value may be specified by the IEEE 802.11be amendment or later versions of the IEEE family of wireless communication standards. In some instances, the scrambler seed value consists of 11 bits, and the polynomial may be expressed as $(Sx)=x^{11}+x^9+1$. In some other instances, the scrambler seed value may include more than 11 bits, and the polynomial may be of a higher order.

The scrambling sequence may be generated by initializing a scrambler (such as the scrambler 850 of FIG. 8B) with the determined scrambler seed value. Once initialized, the scrambler may scramble the contents of the data field, the PHY preamble, and the PHY header of an MPDU using the scrambling sequence. In some instances, the contents of the data field, the PHY preamble, and the PHY header of the MPDU may be serialized and mixed with the scrambling sequence to randomize the data for transmission, for example, in a manner that reduces the PAPR of the PPDU transmission.

The MU-RTS frame may be carried in the MPDU, and the scrambler seed value may be carried in a Service field of the Data field of the PPDU. In some instances, the PPDU may be an EHT PPDU, and the entirety of an 11-bit scrambler seed value may be carried in the Scrambler Initialization field of the Service field of the EHT PPDU. In some other instances, the PPDU may be a HE PPDU, the first 7 bits of an 11-bit scrambler seed value may be carried in the Scrambler Initialization field of the Service field of the HE PPDU, and the remaining 4 bits of the 11-bit scrambler seed value may be carried in 4 corresponding reserved service bits of the Service field of the HE PPDU.

Figure 11:
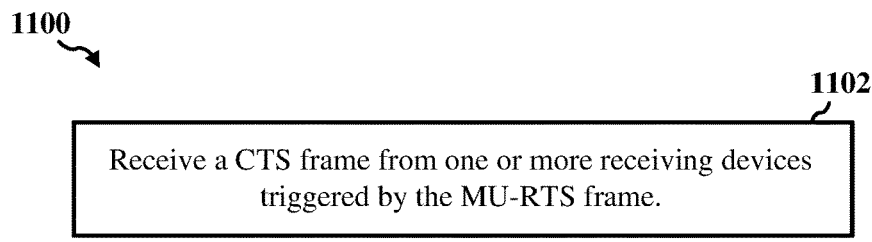
FIG. 11 shows a flowchart illustrating an example process for wireless communication by a transmitting device that supports scrambling wireless communications according to some implementations.

FIG. 11 shows a flowchart illustrating an example process 1100 for wireless communication by a transmitting device that supports scrambling wireless communications. In some implementations, the process 1100 may be performed by a wireless communication device operating as or within an AP, such as one of the APs 102 or 702 described above with reference to FIGS. 1 and 7A, respectively. In some other implementations, the process 1100 may be performed by a wireless communication device operating as or within a network node, such as one of the STAs 104 or 704 described above with reference to FIGS. 1 and 7B, respectively.

In some implementations, the process 1100 may be performed after transmitting the PPDU in block 1010 of FIG. 10. For example, at block 1102, the transmitting device may receive a CTS frame from one or more receiving devices triggered by the MU-RTS frame. In some implementations, the CTS frame may be received in a plurality of non-HT PPDU duplicates. For example, in some instances, each PPDU duplicate of the plurality of non-HT PPDU duplicates may be received on a corresponding 20 MHz frequency subband of a plurality of 20 MHz frequency subbands.

Figure 12:
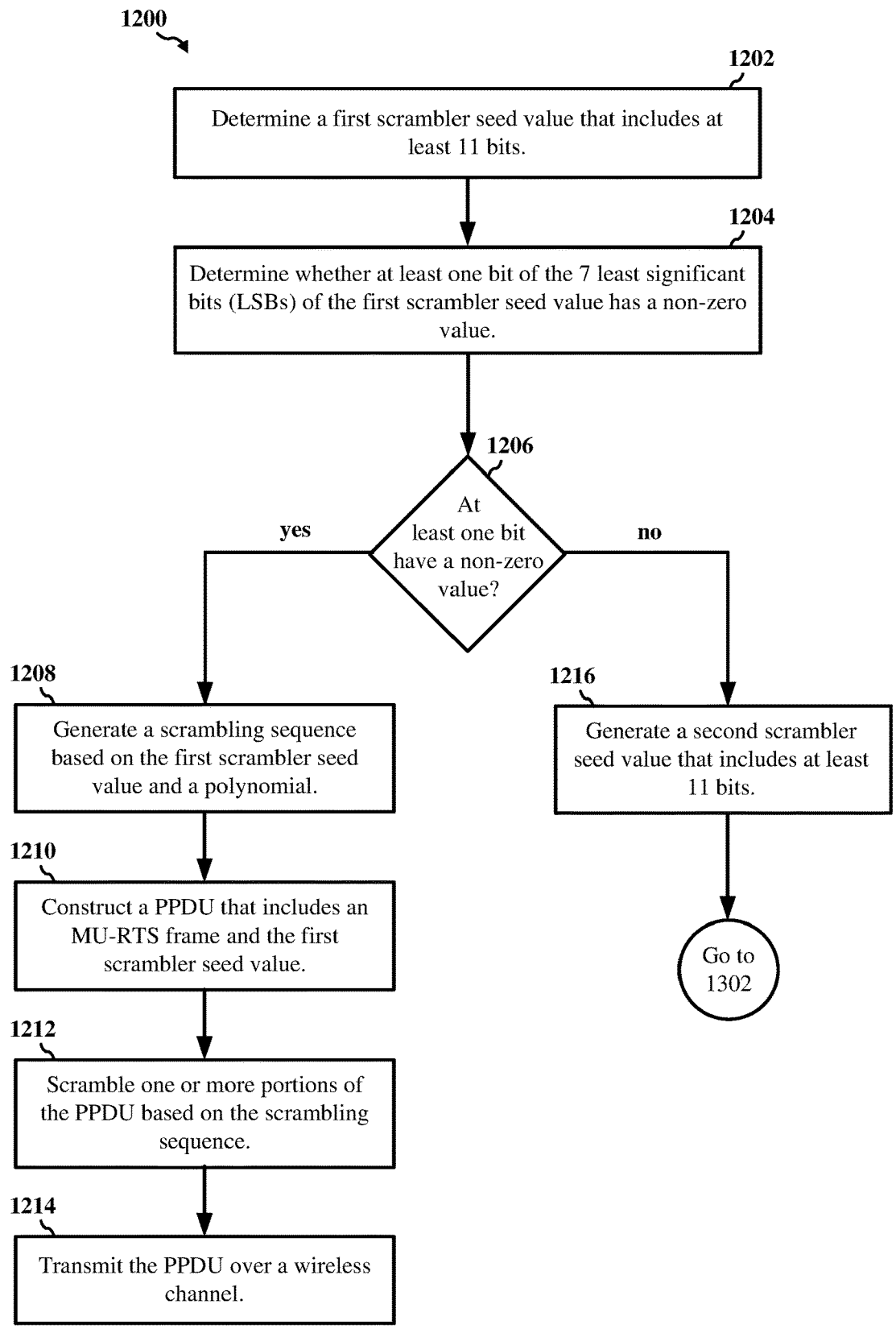
FIG. 12 shows a flowchart illustrating an example process for wireless communication by a transmitting device that supports scrambling wireless communications according to some implementations.

FIG. 12 shows a flowchart illustrating an example process 1200 for wireless communication by a transmitting device that supports scrambling wireless communications. In some implementations, the process 1200 may be performed by a wireless communication device operating as or within an AP, such as one of the APs 102 or 702 described above with reference to FIGS. 1 and 7A, respectively. In some other implementations, the process 1200 may be performed by a wireless communication device operating as or within a network node, such as one of the STAs 104 or 704 described above with reference to FIGS. 1 and 7B, respectively.

In some implementations, the process 1200 may be one example of determining the scrambler seed value in block 1002 of FIG. 10. For example, the process 1200 begins at block 1202 with determining a first scrambler seed value that includes at least 11 bits. The process 1200 proceeds at block 1204 with determining whether at least one bit of the 7 least significant bits (LSBs) of the first scrambler seed value has a non-zero value. If, at block 1206, at least one bit of the 7 LSBs of the first scrambler seed value has a non-zero value, the process 1200 proceeds at block 1208 with generating a scrambling sequence based on the first scrambler seed value and a polynomial. The process 1200 proceeds at block 1210 with constructing a PPDU that includes an MU-RTS frame and the first scrambler seed value. The process 1200 proceeds at block 1212 with scrambling one or more portions of the PPDU based on the scrambling sequence. The process 1200 proceeds at block 1214 with transmitting the PPDU over a wireless channel. Returning to block 1206, if no bit of the 7 LSBs of the first scrambler seed value has a non-zero value, the process 1200 proceeds at block 1216 with generating a second scrambler seed value.

In some implementations, the configuration of the scrambler seed value may be specified by the IEEE 802.11be amendment or later versions of the IEEE family of wireless communication standards. In some instances, the first scrambler seed value consists of 11 bits, and the polynomial may be expressed as $(Sx)=x^{11}+x^9+1$. In some other instances, the first scrambler seed value may include more than 11 bits, and the polynomial may be of a higher order.

The first scrambling sequence may be generated by initializing a scrambler (such as the scrambler 850 of FIG. 8B) with the determined scrambler seed value. Once initialized, the scrambler may scramble the contents of the data field, the PHY preamble, and the PHY header of an MPDU using the scrambling sequence. In some instances, the contents of the data field, the PHY preamble, and the PHY header of the MPDU may be serialized and mixed with the scrambling sequence to randomize the data for transmission, for example, in a manner that reduces the PAPR of the PPDU transmission.

The MU-RTS frame may be carried in the MPDU, and the scrambler seed value may be carried in a Service field of the Data field of the PPDU. In some instances, the PPDU may be an EHT PPDU, and the entirety of an 11-bit scrambler seed value may be carried in the Scrambler Initialization field of the Service field of the EHT PPDU. In some other instances, the PPDU may be a HE PPDU, the first 7 bits of an 11-bit scrambler seed value may be carried in the Scrambler Initialization field of the Service field of the HE PPDU, and the remaining 4 bits of the 11-bit scrambler seed value may be carried in 4 corresponding reserved service bits of the Service field of the HE PPDU.

Figure 13:
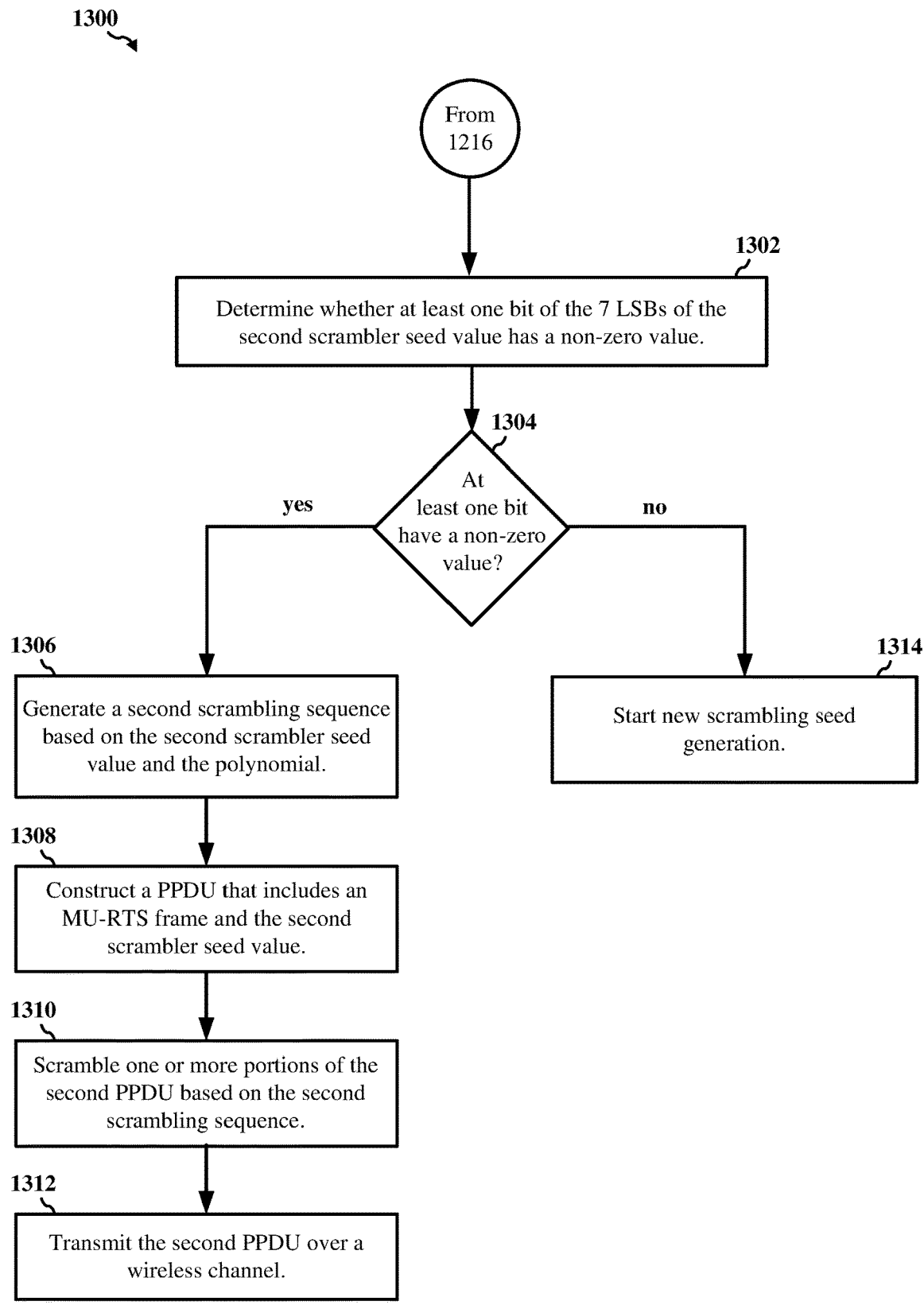
FIG. 13 shows a flowchart illustrating an example processes for wireless communication by a transmitting device that supports scrambling wireless communications according to some implementations.

FIG. 13 shows a flowchart illustrating an example process 1300 for wireless communication by a transmitting device that supports scrambling wireless communications. In some implementations, the process 1300 may be performed by a wireless communication device operating as or within an AP, such as one of the APs 102 or 702 described above with reference to FIGS. 1 and 7A, respectively. In some other implementations, the process 1300 may be performed by a wireless communication device operating as or within a network node, such as one of the STAs 104 or 704 described above with reference to FIGS. 1 and 7B, respectively.

In some implementations, the process 1300 may be performed after the transmitting device generates the second scrambler seed value in block 1216 of FIG. 12. For example, at block 1302, the transmitting device determines whether at least one bit of the 7 LSBs of the second scrambler seed value has a non-zero value. If at least one bit of the 7 LSBs of the second scrambler seed value has a non-zero value, then the process 1300 proceeds at block 1306 with generating a second scrambling sequence based on the second scrambler seed value and the polynomial. The process 1300 proceeds at block 1308 with constructing a second PPDU that includes an MU-RTS frame and the second scrambler seed value. The process 1300 proceeds at block 1310 with scrambling one or more portions of the second PPDU based on the second scrambling sequence. The process 1300 proceeds at block 1312 with transmitting the second PPDU over the wireless channel. Returning to block 1304, if no bit of the 7 LSBs of the second scrambler seed value has a non-zero value, then the process 1300 proceeds at block 1314 with starting a new scrambler seed generation (such as by performing one or more of the operations described with reference to the process 1200 of FIG. 12).

In some implementations, the configuration of the scrambler seed value may be specified by the IEEE 802.11be amendment or later versions of the IEEE family of wireless communication standards. In some instances, the first scrambler seed value consists of 11 bits, and the polynomial may be expressed as $(Sx)=x^{11}+x^9+1$. In some other instances, the first scrambler seed value may include more than 11 bits, and the polynomial may be of a higher order.

The second scrambling sequence may be generated by initializing a scrambler (such as the scrambler 850 of FIG. 8B) with the second scrambler seed value. Once initialized, the scrambler may scramble the contents of the data field, the PHY preamble, and the PHY header of an MPDU using the second scrambling sequence. In some instances, the contents of the data field, the PHY preamble, and the PHY header of the MPDU may be serialized and mixed with the second scrambling sequence to randomize the data for transmission, for example, in a manner that reduces the PAPR of the PPDU transmission.

The MU-RTS frame may be carried in the MPDU, and the second scrambler seed value may be carried in a Service field of the Data field of the PPDU. In some instances, the PPDU may be an EHT PPDU, and the entirety of an 11-bit scrambler seed value may be carried in the Scrambler Initialization field of the Service field of the EHT PPDU. In some other instances, the PPDU may be a HE PPDU, the first 7 bits of an 11-bit scrambler seed value may be carried in the Scrambler Initialization field of the Service field of the HE PPDU, and the remaining 4 bits of the 11-bit scrambler seed value may be carried in 4 corresponding reserved service bits of the Service field of the HE PPDU.

Figure 14:
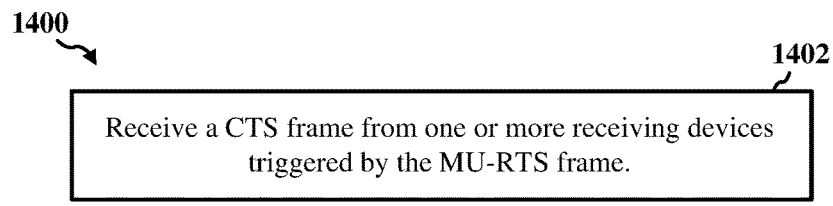
FIG. 14 shows a flowchart illustrating an example process for wireless communication by a transmitting device that supports scrambling wireless communications according to some implementations.

FIG. 14 shows a flowchart illustrating an example process 1400 for wireless communication by a transmitting device that supports scrambling wireless communications. In some implementations, the process 1400 may be performed by a wireless communication device operating as or within an AP, such as one of the APs 102 or 702 described above with reference to FIGS. 1 and 7A, respectively. In some other implementations, the process 1400 may be performed by a wireless communication device operating as or within a network node, such as one of the STAs 104 or 704 described above with reference to FIGS. 1 and 7B, respectively.

In some implementations, the process 1400 may be performed after transmitting the second PPDU in block 1312 of FIG. 13. For example, at block 1402, the transmitting device may receive a CTS frame from one or more receiving devices triggered by the MU-RTS frame. In some implementations, the CTS frame may be received in a plurality of non-HT PPDU duplicates. For example, in some instances, each PPDU duplicate of the plurality of non-HT PPDU duplicates may be received on a corresponding 20 MHz frequency subband of a plurality of 20 MHz frequency subbands.

Figure 15:
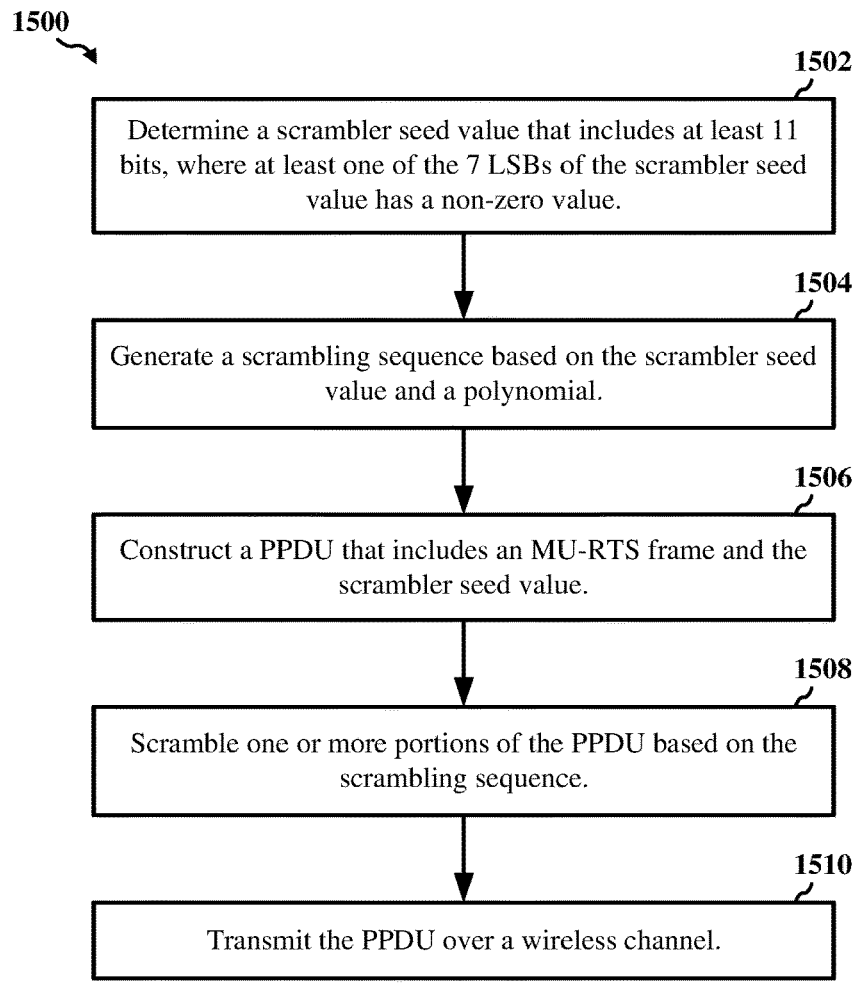
FIG. 15 shows a flowchart illustrating an example process for wireless communication by a transmitting device that supports scrambling wireless communications according to some implementations.

FIG. 15 shows a flowchart illustrating an example process 1500 for wireless communication by a transmitting device that supports scrambling wireless communications. In some implementations, the process 1500 may be performed by a wireless communication device operating as or within an AP, such as one of the APs 102 or 702 described above with reference to FIGS. 1 and 7A, respectively. In some other implementations, the process 1500 may be performed by a wireless communication device operating as or within a network node, such as one of the STAs 104 or 704 described above with reference to FIGS. 1 and 7B, respectively.

In some implementations, the process 1500 begins at block 1502 with determining a scrambler seed value that includes at least 11 bits, where at least one of the 7 LSBs of the scrambler seed value has a non-zero value. The process 1500 proceeds at block 1504 with generating a scrambling sequence based on the scrambler seed value and a polynomial. The process 1500 proceeds at block 1506 with constructing a PPDU that includes an MU-RTS frame and the scrambler seed value. The process 1500 proceeds at block 1508 with scrambling one or more portions of the PPDU based on the scrambling sequence. The process 1500 proceeds at block 1510 with transmitting the PPDU over a wireless channel.

In some implementations, the configuration is specified by the IEEE 802.11be amendment or later versions of the IEEE family of wireless communication standards. In some instances, the scrambler seed value consists of 11 bits, and the polynomial may be expressed as $x^{11}+x^9+1$. In some other instances, the scrambler seed value may include more than 11 bits, and the polynomial may be of a higher order.

The scrambling sequence may be generated by initializing a scrambler (such as the scrambler 850 of FIG. 8B) with the determined scrambler seed value. Once initialized, the scrambler may scramble the contents of the data field, the PHY preamble, and the PHY header of an MPDU using the scrambling sequence. In some instances, the contents of the data field, the PHY preamble, and the PHY header of the MPDU may be serialized and mixed with the scrambling sequence to randomize the data for transmission, for example, in a manner that reduces the PAPR of the PPDU transmission.

The MU-RTS frame may be carried in the MPDU, and the scrambler seed value may be carried in a Service field of the Data field of the PPDU. In some instances, the PPDU may be an EHT PPDU, and the entirety of an 11-bit scrambler seed value may be carried in the Scrambler Initialization field of the Service field of the EHT PPDU. In some other instances, the PPDU may be a HE PPDU, the first 7 bits of an 11-bit scrambler seed value may be carried in the Scrambler Initialization field of the Service field of the HE PPDU, and the remaining 4 bits of the 11-bit scrambler seed value may be carried in 4 corresponding reserved service bits of the Service field of the HE PPDU.

Figure 16:
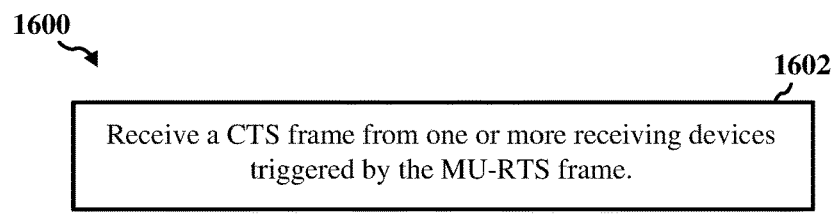
FIG. 16 shows a flowchart illustrating an example process for wireless communication by a transmitting device that supports scrambling wireless communications according to some implementations.

FIG. 16 shows a flowchart illustrating an example process 1600 for wireless communication by a transmitting device that supports scrambling wireless communications. In some implementations, the process 1600 may be performed by a wireless communication device operating as or within an AP, such as one of the APs 102 or 702 described above with reference to FIGS. 1 and 7A, respectively. In some other implementations, the process 1600 may be performed by a wireless communication device operating as or within a network node, such as one of the STAs 104 or 704 described above with reference to FIGS. 1 and 7B, respectively.

In some implementations, the process 1600 may be performed after transmitting the PPDU over the wireless channel in block 1510 of FIG. 15. For example, at block 1602, the transmitting device may receive a CTS frame from one or more receiving devices triggered by the MU-RTS frame. In some implementations, the CTS frame may be received in a plurality of non-HT PPDU duplicates. For example, in some instances, each PPDU duplicate of the plurality of non-HT PPDU duplicates may be received on a corresponding 20 MHz frequency subband of a plurality of 20 MHz frequency subbands.

Figure 17:
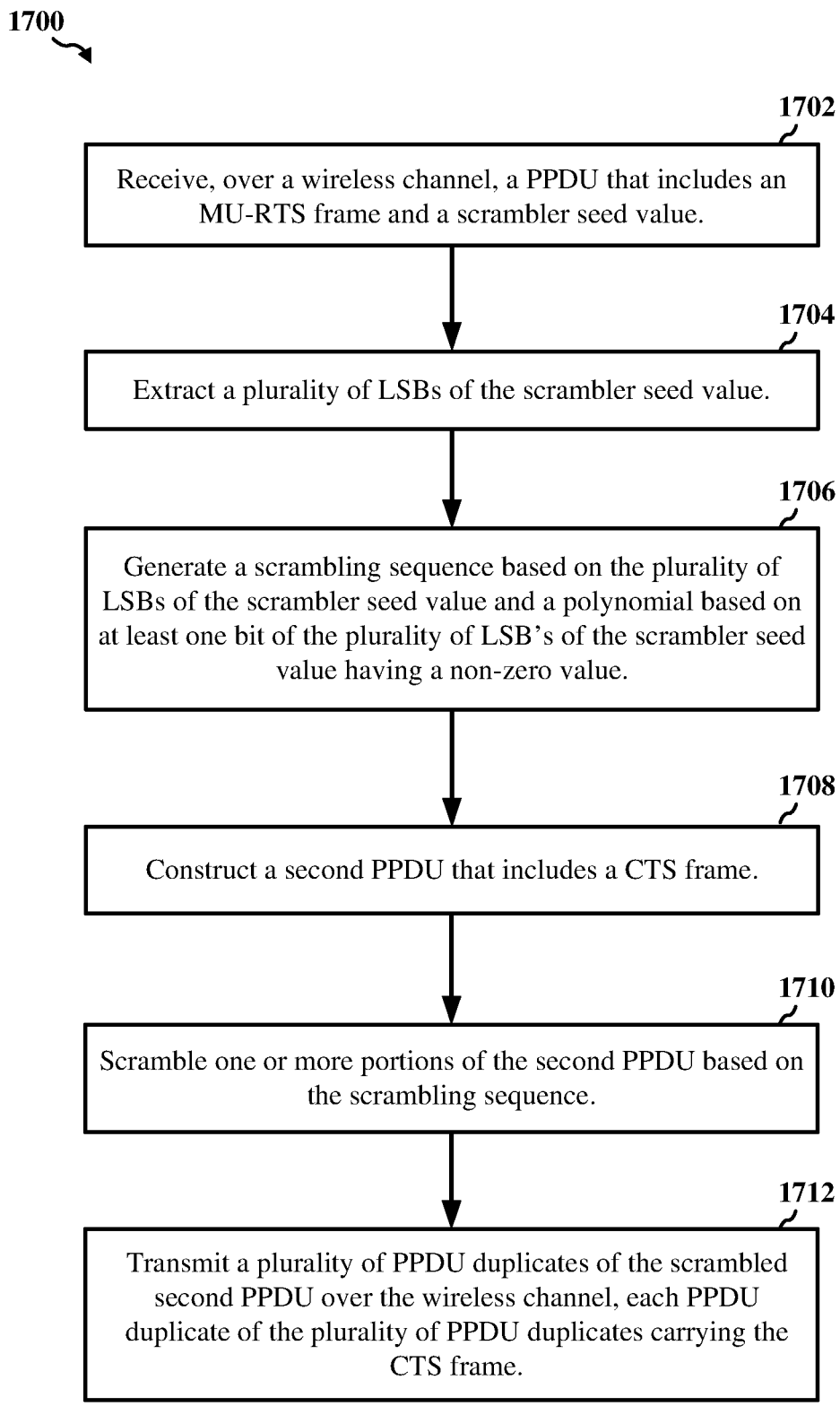
FIG. 17 shows a flowchart illustrating an example process for wireless communication by a receiving device that supports scrambling wireless communications according to some implementations.

FIG. 17 shows a flowchart illustrating an example process 1700 for wireless communication by a receiving device that supports scrambling wireless communications. In some implementations, the process 1700 may be performed by a wireless communication device operating as or within a network node, such as one of the STAs 104 or 704 described above with reference to FIGS. 1 and 7B, respectively. In some other implementations, the process 1700 may be performed by a wireless communication device operating as or within an AP, such as one of the APs 102 or 702 described above with reference to FIGS. 1 and 7A, respectively.

In some implementations, the process 1700 begins in block 1702 with receiving, over a wireless channel, a PPDU that includes an MU-RTS frame and a scrambler seed value. The process 1700 proceeds at block 1704 with extracting a plurality of least significant bits (LSBs) of the scrambler seed value. The process 1700 proceeds at block 1706 with generating a scrambling sequence based on the plurality of LSBs of the received scrambler seed value and a polynomial based on at least one bit of the plurality of LSB's of the scrambler seed value having a non-zero value. The process 1700 proceeds at block 1708 with constructing a second PPDU that includes a CTS frame. The process 1700 proceeds at block 1710 with scrambling one or more portions of the second PPDU based on the scrambling sequence. The process 1700 proceeds at block 1712 with transmitting a plurality of PPDU duplicates of the scrambled second PPDU over the wireless channel, each PPDU duplicate of the plurality of PPDU duplicates carrying the CTS frame.

In some implementations, the configuration of the scrambler seed value may be specified by the IEEE 802.11be amendment or later versions of the IEEE family of wireless communication standards. In some instances, the scrambler seed value consists of 11 bits, and the polynomial may be expressed as $(Sx)=x^{11}+x^9+1$. In some other instances, the scrambler seed value may include more than 11 bits, and the polynomial may be of a higher order.

In some implementations, a frequency bandwidth spanned by the received PPDU may include a plurality of 20 MHz frequency subbands, and each PPDU duplicate of the plurality of PPDU duplicates may be transmitted on a corresponding 20 MHz frequency subband of the plurality of 20 MHz frequency subbands. In some instances, the scrambler seed value includes at least 11 bits, and at least one bit of the plurality of LSBs of the scrambler seed value is configured to have a non-zero value. The plurality of LSBs may consist of the 7 LSBs of the received scrambler seed value.

Figure 18:
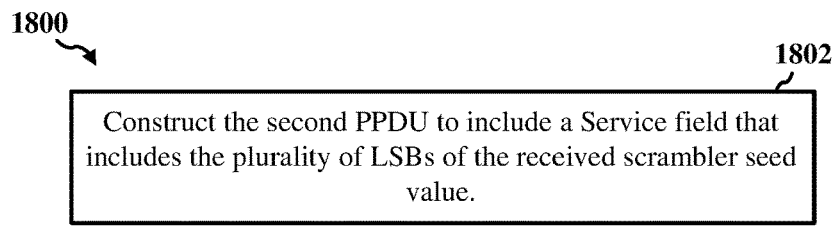
FIG. 18 shows a flowchart illustrating an example process for wireless communication by a receiving device that supports scrambling wireless communications according to some implementations.

FIG. 18 shows a flowchart illustrating an example process 1800 for wireless communication by a receiving device that supports scrambling wireless communications. In some implementations, the process 1800 may be performed by a wireless communication device operating as or within a network node, such as one of the STAs 104 or 704 described above with reference to FIGS. 1 and 7B, respectively. In some other implementations, the process 1800 may be performed by a wireless communication device operating as or within an AP, such as one of the APs 102 or 702 described above with reference to FIGS. 1 and 7A, respectively.

In some implementations, the process 1800 may be performed after transmitting the plurality of PPDU duplicates in block 1712 of FIG. 17. For example, at block 1802, the receiving device may construct the second PPDU to include a Service field that includes the plurality of LSBs of the received scrambler seed value. In some instances, the second PPDU may include a Service field that carries an 11-bit scrambler seed value. In some other instances, the second PPDU may include a Service field that carries the 7 LSBs of the scrambler seed value.

Figure 19:
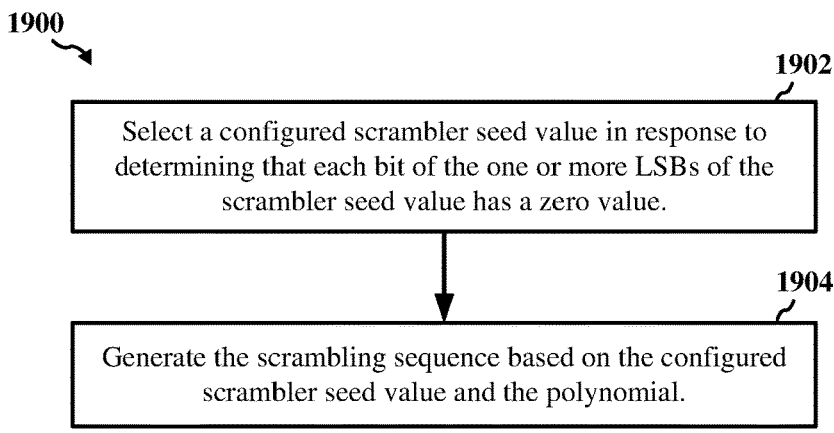
FIG. 19 shows a flowchart illustrating an example process for wireless communication by a receiving device that supports scrambling wireless communications according to some implementations.

FIG. 19 shows a flowchart illustrating an example process 1900 for wireless communication by a receiving device that supports scrambling wireless communications. In some implementations, the process 1900 may be performed by a wireless communication device operating as or within a network node, such as one of the STAs 104 or 704 described above with reference to FIGS. 1 and 7B, respectively. In some other implementations, the process 1900 may be performed by a wireless communication device operating as or within an AP, such as one of the APs 102 or 702 described above with reference to FIGS. 1 and 7A, respectively.

In some implementations, the process 1900 may be performed after transmitting the plurality of PPDU duplicates in block 1712 of FIG. 17. For example, at block 1902, the receiving device may select a configured scrambler seed value in response to determining that each bit of the one or more LSBs of the scrambler seed value has a zero value. At block 1904, the receiving device may generate the scrambling sequence based on the configured scrambler seed value and the polynomial. In some implementations, the configured scrambler seed value may be specified by the IEEE 802.11be amendment or later versions of the IEEE family of wireless communication standards. In some instances, the received scrambler seed value consists of 11 bits, the plurality of LSBs consist of the 7 LSBs of the received scrambler seed value, the configured scrambler seed value consists of 7 bits, and at least one bit of the 7-bit configured scrambler seed value has a non-zero value. For example, in some implementations, the configured scrambler seed value may be one of "0000001" or "1111111."

Figure 20:
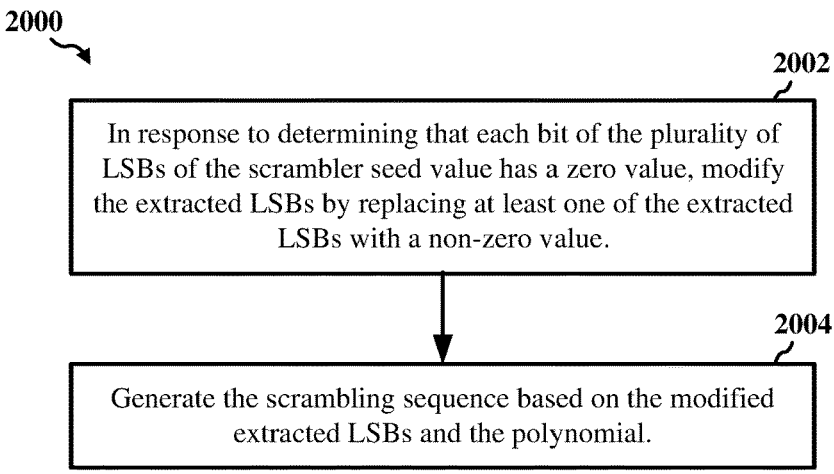
FIG. 20 shows a flowchart illustrating an example process for wireless communication by a receiving device that supports scrambling wireless communications according to some implementations.

FIG. 20 shows a flowchart illustrating an example process 2000 for wireless communication by a receiving device that supports scrambling wireless communications. In some implementations, the process 2000 may be performed by a wireless communication device operating as or within a network node, such as one of the STAs 104 or 704 described above with reference to FIGS. 1 and 7B, respectively. In some other implementations, the process 2000 may be performed by a wireless communication device operating as or within an AP, such as one of the APs 102 or 702 described above with reference to FIGS. 1 and 7A, respectively.

In some implementations, the process 2000 may be performed after transmitting the plurality of PPDU duplicates in block 1712 of FIG. 17. For example, at block 2002, the receiving device may, in response to determining that each bit of the plurality of LSBs of the scrambler seed value has a zero value, modify the extracted LSBs by replacing at least one of the extracted LSBs with a non-zero value. At block 2004, the receiving device may generate the scrambling sequence based on the modified extracted LSBs and the polynomial.

Figure 21:
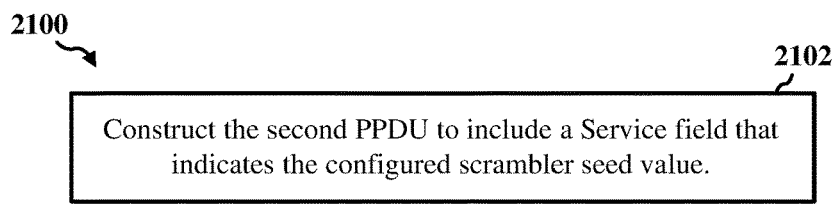
FIG. 21 shows a flowchart illustrating an example process for wireless communication by a receiving device that supports scrambling wireless communications according to some implementations.

FIG. 21 shows a flowchart illustrating an example process 2100 for wireless communication by a receiving device that supports scrambling wireless communications. In some implementations, the process 2100 may be performed by a wireless communication device operating as or within a network node, such as one of the STAs 104 or 704 described above with reference to FIGS. 1 and 7B, respectively. In some other implementations, the process 2100 may be performed by a wireless communication device operating as or within an AP, such as one of the APs 102 or 702 described above with reference to FIGS. 1 and 7A, respectively.

In some implementations, the process 2100 may be performed after generating the scrambling sequence in block 2004 of FIG. 20. For example, at block 2102, the receiving device may construct the second PPDU to include a Service field that indicates the configured scrambler seed value. In some implementations, the scrambler seed value consists of 11 bits, and the polynomial may be expressed as $(Sx)=x^{11}+x^9+1$. In some instances, the received PPDU may be an EHT PPDU, and an entirety of the scrambler seed value may be carried in a Scrambler Initialization field of a Service field of the received EHT PPDU. For example, the scrambler seed value may consist of 11 bits. In some other instances, the received PPDU may be a HE PPDU, a first portion of the scrambler seed value may be carried in a Scrambler Initialization field of a Service field of the received HE PPDU, and a second portion of the scrambler seed value may be carried in one or more reserved service bits of the Service field of the received HE PPDU. For example, the first portion of the scrambler seed value may consist of 7 bits, and may be carried in the 7-bit Scrambler Initialization field of a Service field of a received HE PPDU.

Figure 22:
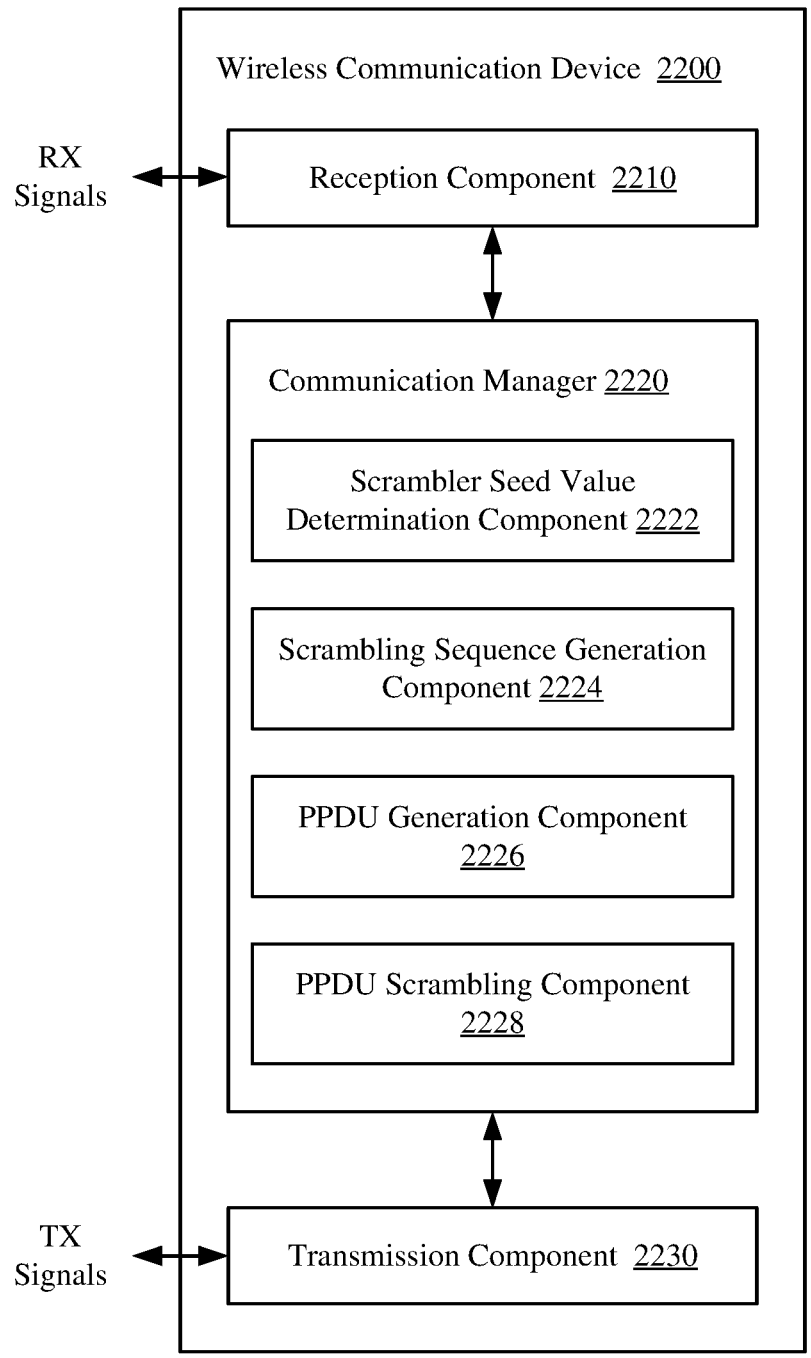
FIG. 22 shows a block diagram of an example wireless communication device according to some implementations.

FIG. 22 shows a block diagram of an example wireless communication device 2200 according to some implementations. In some implementations, the wireless communication device 2200 is configured as a transmitting device to perform the communications 900 of FIG. 9A, the communications 950 of FIG. 9B, or both. The wireless communication device 2200 can be an example implementation of the wireless communication device 600 described above with reference to FIG. 6. For example, the wireless communication device 2200 can be a chip, SoC, chipset, package or device that includes at least one processor and at least one modem (for example, a Wi-Fi (IEEE 802.11) modem or a cellular modem). In some implementations, the wireless communication device 2200 can be a device for use in an AP, such as one of the APs 102 and 702 described with reference to FIGS. 1 and 7A, respectively. In some other implementations, the wireless communication device 2200 can be an AP that includes such a chip, SoC, chipset, package or device as well as at least one antenna (such as the antennas 720).

The wireless communication device 2200 includes a reception component 2210, a communication manager 2220, and a transmission component 2230. The communication manager 2220 further includes a scrambler seed value determination component 2222, a scrambling sequence generation component 2224, a PPDU generation component 2226, and a PPDU scrambling component 2228. Portions of one or more of the components 2222, 2224, 2226, and 2228 may be implemented at least in part in hardware or firmware. In some implementations, at least some of the components 2222, 2224, 2226, and 2228 are implemented at least in part as software stored in a memory (such as the memory 508). For example, portions of one or more of the components 2222, 2224, 2226, and 2228 can be implemented as non-transitory instructions (or "code") executable by a processor (such as the processor 506) to perform the functions or operations of the respective component.

The reception component 2210 is configured to receive RX signals, over a wireless channel, from one or more other wireless communication devices. The communication manager 2220 is configured to control or manage communications with the one or more other wireless communication devices. In some implementations, the scrambling sequence determination component 2222 may determine a scrambler seed value that includes at least 11 bits, where at least one of the 7 least significant bits (LSBs) of the scrambler seed value has a non-zero value. The scrambling sequence generation component 2224 may generate a scrambling sequence based on the scrambler seed value and a polynomial. The PPDU generation component 2226 may generate or construct a PPDU that includes an MU-RTS frame and the scrambler seed value. The PPDU scrambling component 2228 scrambles one or more portions of the PPDU based on the scrambling sequence. The transmission component 2230 may transmit TX signals (such as the scrambled PPDU) over the wireless channel to one or more other wireless communication devices.

Figure 23:
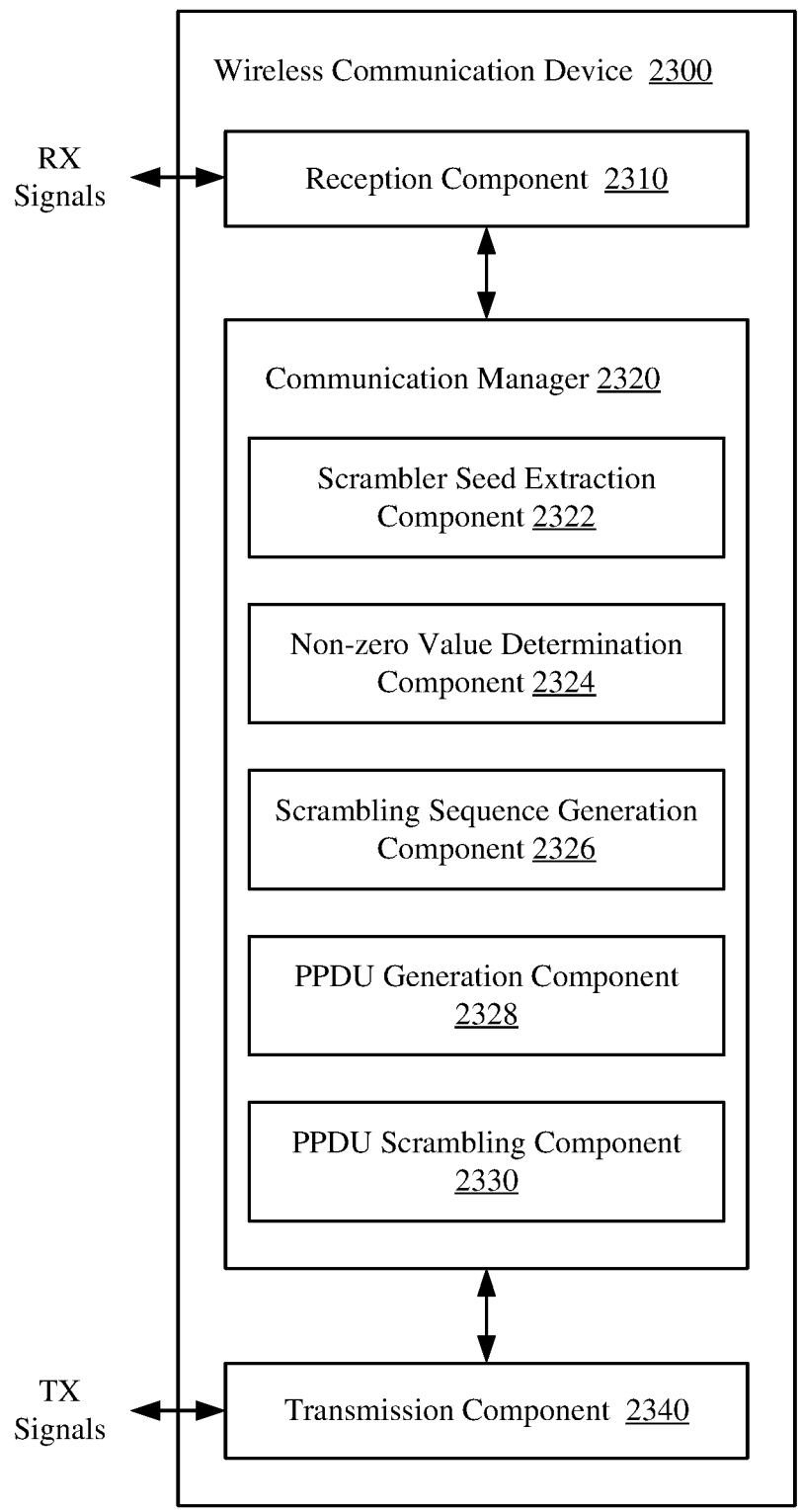
FIG. 23 shows a block diagram of an example wireless communication device according to some other implementations.

FIG. 23 shows a block diagram of an example wireless communication device 2300 according to some implementations. In some implementations, the wireless communication device 2300 is configured as a receiving device to perform the communications 900 of FIG. 9A, the communications 950 of FIG. 9B, or both. The wireless communication device 2300 can be an example implementation of the wireless communication device 600 described above with reference to FIG. 6. For example, the wireless communication device 2300 can be a chip, SoC, chipset, package or device that includes at least one processor and at least one modem (for example, a Wi-Fi (IEEE 802.11) modem or a cellular modem). In some implementations, the wireless communication device 2300 can be a device for use in a STA, such as one of the STAs 104 and 704 described with reference to FIGS. 1 and 7B, respectively. In some other implementations, the wireless communication device 2300 can be a STA that includes such a chip, SoC, chipset, package or device as well as at least one antenna (such as the antennas 725).

The wireless communication device 2300 includes a reception component 2310, a communication manager 2320, and a transmission component 2340. The communication manager 2320 further includes a scrambler seed extraction component 2322, a non-zero value determination component 2324, a scrambling sequence generation component 2326, a PPDU generation component 2328, and a PPDU scrambling component 2330. Portions of one or more of the components 2322, 2324, 2326, 2328, and 2330 may be implemented at least in part in hardware or firmware. In some implementations, at least some of the components 2322, 2324, 2326, 2328, and 2330 are implemented at least in part as software stored in a memory (such as the memory 508). For example, portions of one or more of the components 2322, 2324, 2326, 2328, and 2330 can be implemented as non-transitory instructions (or "code") executable by a processor (such as the processor 506) to perform the functions or operations of the respective component.

The reception component 2310 is configured to receive RX signals, over a wireless channel, from one or more other wireless communication devices. In some instances, the reception component 2310 may receive an MU-RTS and a scrambler seed value carried in a first PPDU over the wireless channel. The communication manager 2320 is configured to control or manage communications with the one or more other wireless communication devices. In some implementations, the scrambler seed extraction component 2322 extracts a plurality of least significant bits (LSBs) of the scrambler seed value. The non-zero value determination component 2324 determines whether at least one bit of the plurality of LSB's of the scrambler seed value has a non-zero value. The scrambling sequence generation component 2326 generates a scrambling sequence based on the plurality of LSBs of the scrambler seed value and a polynomial based on at least one bit of the plurality of LSB's of the scrambler seed value having a non-zero value. The PPDU generation component 2328 generates or constructs a second PPDU that includes a CTS frame. The PPDU scrambling component 2330 scrambles one or more portions of the second PPDU based on the scrambling sequence. In some instances, the PPDU generation component 2328 may also generate a plurality of PPDU duplicates based on duplication of the scrambled second PPDU. The transmission component 2340 may transmit TX signals, over the wireless channel, to one or more other wireless communication devices. In some instances, the transmission component 2340 may transmit the plurality of PPDU duplicates over the wireless channel, each PPDU duplicate of the plurality of PPDU duplicates carrying the CTS frame.

Implementation examples are described in the following numbered clauses:

1. A method for wireless communication performed by a transmitting device, the method including:
   determining a scrambler seed value that includes at least 11 bits, where at least one of the 7 least significant bits (LSBs) of the scrambler seed value has a non-zero value;
   generating a scrambling sequence based on the scrambler seed value and a polynomial;
   constructing a physical layer convergence protocol (PLCP) protocol data unit (PPDU) that includes a multi-user (MU) request-to-send (RTS) frame and the scrambler seed value;
   scrambling one or more portions of the PPDU based on the scrambling sequence; and
   transmitting the PPDU over a wireless medium.
2. The method of clause 1, where the configuration of the scrambler seed value is specified by the Institute of Electrical and Electronics Engineers (IEEE) 802.11be amendment or later versions of the IEEE family of wireless communication standards.
3. The method of any one or more of clauses 1-2, where the scrambler seed value consists of 11 bits, and the polynomial includes $x^{11}+x^9+1$.
4. The method of any one or more of clauses 1-3, where the PPDU includes an extremely high throughput (EHT) PPDU, and the entirety of the scrambler seed value is carried in a Scrambler Initialization field of a Service field of the EHT PPDU.
5. The method of any one or more of clauses 1-4, where the PPDU includes a high efficiency (HE) PPDU, a first portion of the scrambler seed value is carried in a Scrambler Initialization field of a Service field of the HE PPDU, and a second portion of the scrambler seed value is carried in one or more reserved service bits of the Service field of the HE PPDU.
6. The method of clause 5, where the first portion of the scrambler seed value consists of 7 bits, and the second portion of the scrambler seed value consists of 4 bits.
7. The method of any one or more of clauses 1-6, where the MU RTS frame includes a trigger frame, the method further including:
   receiving a clear-to-send (CTS) frame from one or more receiving devices triggered by the MU RTS frame, the CTS frame carried in a plurality of non-high throughput (non-HT) PPDU duplicates received over a plurality of respective 20 MHz frequency subbands.
8. The method of any one or more of clauses 1-7, where determining the scrambler seed value includes:
   determining a first scrambler seed value;
   determining whether at least one bit of the 7 LSBs of the first scrambler seed value has a non-zero value;

responsive to determining that at least one bit of the 7 LSBs of the first scrambler seed value has a non-zero value, using the first scrambler seed value as the scrambler seed value; and responsive to determining that no bit of the 7 LSBs of the first scrambler seed value has a non-zero value, generating a second scrambler seed value that includes at least 11 bits.

9. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to:

determine a scrambler seed value that includes at least 11 bits, where at least one of the 7 least significant bits (LSBs) of the scrambler seed value has a non-zero value;

generate a scrambling sequence based on the scrambler seed value and a polynomial;

construct a physical layer convergence protocol (PLCP) protocol data unit (PPDU) that includes a multi-user (MU) request-to-send (RTS) frame and the scrambler seed value;

scramble one or more portions of the PPDU based on the scrambling sequence; and transmit the PPDU over a wireless medium.

10. The wireless communication device of clause 9, where the scrambler seed value consists of 11 bits, and the polynomial includes $x^{11}+x^9+1$.

11. The wireless communication device of any one or more of clauses 9-10, where the PPDU includes an extremely high throughput (EHT) PPDU, and the entirety of the scrambler seed value is carried in a Scrambler Initialization field of a Service field of the EHT PPDU.

12. The wireless communication device of any one or more of clauses 9-11, where the PPDU includes a high efficiency (HE) PPDU, a first portion of the scrambler seed value is carried in a Scrambler Initialization field of a Service field of the HE PPDU, and a second portion of the scrambler seed value is carried in one or more reserved service bits of the Service field of the HE PPDU.

13. The wireless communication device of clause 12, where the first portion of the scrambler seed value consists of 7 bits, and the second portion of the scrambler seed value consists of 4 bits.

14. The wireless communication device of clause 9, where the MU RTS frame includes a trigger frame, and execution of the processor-readable code is further configured to:

receive a clear-to-send (CTS) frame from one or more receiving devices triggered by the MU RTS frame, the CTS frame carried in a plurality of non-high throughput (non-HT) PPDU duplicates received over a plurality of respective 20 MHz frequency subbands.

15. The wireless communication device of any one or more of clauses 9-14, where determining the scrambler seed value includes:

determining a first scrambler seed value;

determining whether at least one bit of the 7 LSBs of the first scrambler seed value has a non-zero value;

responsive to determining that at least one bit of the 7 LSBs of the first scrambler seed value has a non-zero value, using the first scrambler seed value as the scrambler seed value; and responsive to determining that no bit of the 7 LSBs of the first scrambler seed value has a non-zero value, generating a second scrambler seed value that includes at least 11 bits.

16. A method for wireless communication performed by a receiving device, the method including:

receiving, over a wireless medium, a first physical layer convergence protocol (PLCP) protocol data unit (PPDU) that includes a multi-user (MU) request-to-send (RTS) frame and a scrambler seed value;

extracting a plurality of least significant bits (LSBs) of the scrambler seed value;

generating a scrambling sequence based on the plurality of LSBs of the received scrambler seed value and a polynomial based on at least one bit of the plurality of LSBs of the scrambler seed value having a non-zero value;

constructing a second PPDU that includes a clear-to-send (CTS) frame;

scrambling one or more portions of the second PPDU based on the scrambling sequence; and transmitting a plurality of PPDU duplicates of the scrambled second PPDU over the wireless medium, each PPDU duplicate of the plurality of PPDU duplicates carrying the CTS frame.

17. The method of clause 16, where a frequency bandwidth spanned by the first PPDU received over the wireless medium includes a plurality of 20 MHz frequency subbands, and each PPDU duplicate of the plurality of PPDU duplicates is transmitted on a corresponding 20 MHz frequency subband of the plurality of 20 MHz frequency subbands.

18. The method of any one or more of clauses 16-17, where the received scrambler seed value includes at least 11 bits, at least one bit of the plurality of LSBs of the received scrambler seed value has a non-zero value, and the plurality of LSBs consist of the 7 LSBs of the received scrambler seed value.

19. The method of clause 18, where the second PPDU includes a Service field that carries the 7 LSBs of the received scrambler seed value.

20. The method of any one or more of clauses 16-19, where the generating includes:

selecting a configured scrambler seed value in response to determining that each bit of the one or more LSBs of the received scrambler seed value has a zero value; and generating the scrambling sequence based on the configured scrambler seed value and the polynomial.

21. The method of clause 20, where the configured scrambler seed value consists of 7 bits and is specified by the Institute of Electrical and Electronics Engineers (IEEE) 802.11be amendment or later versions of the IEEE family of wireless communication standards.

22. The method of any one or more of clauses 20-21, where the configured scrambler seed value is one of "0000001" or "1111111."

23. The method of clause 16, where the generating includes:

in response to determining that each bit of the plurality of LSBs of the received scrambler seed value has a zero value, modifying the extracted LSBs of the received scrambler seed value by replacing at least one of the extracted LSBs with a non-zero value; and generating the scrambling sequence based on the modified extracted LSBs and the polynomial.

24. The method of any one or more of clauses 16-23, where the scrambler seed value consists of 11 bits, and the polynomial includes $x^{11}+x^9+1$.

25. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive, over a wireless medium, a first physical layer convergence protocol (PLCP) protocol data unit (PPDU) that includes a multi-user (MU) request-to-send (RTS) frame and a scrambler seed value;
extract a plurality of least significant bits (LSBs) of the scrambler seed value;
generate a scrambling sequence based on the plurality of LSBs of the received scrambler seed value and a polynomial based on at least one bit of the plurality of LSBs of the scrambler seed value having a non-zero value;
construct a second PPDU that includes a clear-to-send (CTS) frame;
scramble one or more portions of the second PPDU based on the scrambling sequence; and
transmit a plurality of PPDU duplicates of the scrambled second PPDU over the wireless medium, each PPDU duplicate of the plurality of PPDU duplicates carrying the CTS frame.

26. The wireless communication device of clause 25, where a frequency bandwidth spanned by the first PPDU received over the wireless medium includes a plurality of 20 MHz frequency subbands, and each PPDU duplicate of the plurality of PPDU duplicates is transmitted on a corresponding 20 MHz frequency subband of the plurality of 20 MHz frequency subbands.

27. The wireless communication device of any one or more of clauses 25-26, where the scrambler seed value includes at least 11 bits, at least one bit of the plurality of LSBs of the received scrambler seed value has a non-zero value, and the plurality of LSBs consist of the 7 LSBs of the received scrambler seed value.

28. The wireless communication device of clause 27, where the second PPDU includes a Service field that carries the 7 LSBs of the received scrambler seed value.

29. The wireless communication device of any one or more of clauses 25-28, where execution of the processor-readable code is further configured to:
select a configured scrambler seed value in response to determining that each bit of the one or more LSBs of the received scrambler seed value has a zero value; and
generate the scrambling sequence based on the configured scrambler seed value and the polynomial.

30. The wireless communication device of any one or more of clauses 25-29, where execution of the processor-readable code is further configured to:
in response to determining that each bit of the plurality of LSBs of the received scrambler seed value has a zero value, modify the extracted LSBs of the received scrambler seed value by replacing at least one of the extracted LSBs with a non-zero value; and
generate the scrambling sequence based on the modified extracted LSBs and the polynomial.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method for wireless communication performed at a transmitting device, the method comprising:

generating a second scrambler seed value being associated with at least 11 bits, the generation being based on 7 least significant bits (LSBs) associated with a first scrambler seed value, wherein each of the 7 LSBs has a value of zero;

generating a scrambling sequence based on the second scrambler seed value and a polynomial, wherein at least one bit of a portion of the at least 11 bits has a non-zero value, the portion comprising 7 LSBs of the second scrambler seed value;

constructing a physical layer convergence protocol (PLCP) protocol data unit (PPDU) that includes a multi-user (MU) request-to-send (RTS) frame and the second scrambler seed value;

scrambling one or more portions of the PPDU based on the scrambling sequence;

transmitting the one or more scrambled portions of the PPDU; and receiving, after transmitting the one or more scrambled portions, clear-to-send (CTS) frames, via PPDU duplicates, wherein each of the PPDU duplicates carries the CTS frame and is received over a corresponding 20 MHz frequency subband.

2. The method of claim 1, wherein a configuration of the second scrambler seed value is specified by the Institute of Electrical and Electronics Engineers (IEEE) 802.11 be amendment or later versions of the IEEE family of wireless communication standards.

3. The method of claim 1, wherein at least one of: the second scrambler seed value is associated with 11 bits or the polynomial comprises x11+x9+1.

4. The method of claim 1, wherein the PPDU comprises an extremely high throughput (EHT) PPDU, and an entirety of the at least 11 bits is carried in a Scrambler Initialization field of a Service field of the EHT PPDU.

5. The method of claim 1, wherein the PPDU comprises a high efficiency (HE) PPDU, a first portion of the at least 11 bits is carried in a Scrambler Initialization field of a Service field of the HE PPDU, and a second portion of the at least 11 bits is carried in the Service field of the HE PPDU.

6. The method of claim 5, wherein the first portion of the at least 11 bits is associated with 7 bits, and the second portion of the at least 11 bits is associated with 4 bits.

7. The method of claim 1, wherein generating the second scrambler seed value further comprises:
generating the first scrambler seed value, wherein each of the 7 LSBs of the first scrambler seed value has a value of zero.

8. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to cause the wireless communication device to:
generate a second scrambler seed value being associated with at least 11 bits, the generation being based on 7 least significant bits (LSBs) associated with a first scrambler seed value, wherein each of the 7 LSBs has a value of zero;
generate a scrambling sequence based on the second scrambler seed value and a polynomial, wherein at least one bit of a portion of the at least 11 bits has a non-zero value, the portion comprising 7 LSBs of the second scrambler seed value;
construct a physical layer convergence protocol (PLCP) protocol data unit (PPDU) that includes a multi-user (MU) request-to-send (RTS) frame and the second scrambler seed value;
scramble one or more portions of the PPDU based on the scrambling sequence;
transmit the one or more scrambled portions of the PPDU; and
receive, after transmitting the one or more scrambled portions of the PPDU, clear-to-send (CTS) frames, via PPDU duplicates, wherein each of the PPDU duplicates carries the CTS frame and is received over a corresponding 20 MHz frequency subband.

9. The wireless communication device of claim 8, wherein at least one of: the second scrambler seed value is associated with 11 bits or the polynomial comprises x11+x9+1.

10. The wireless communication device of claim 8, wherein the PPDU comprises an extremely high throughput (EHT) PPDU, and an entirety of the at least 11 bits is carried in a Scrambler Initialization field of a Service field of the EHT PPDU.

11. The wireless communication device of claim 8, wherein the PPDU comprises a high efficiency (HE) PPDU, a first portion of the at least 11 bits is carried in a Scrambler Initialization field of a Service field of the HE PPDU, and a second portion of the at least 11 bits is carried in the Service field of the HE PPDU.

12. The wireless communication device of claim 11, wherein the first portion of the at least 11 bits is associated with of 7 bits, and the second portion of the at least 11 bits is associated with 4 bits.

13. The wireless communication device of claim 8, wherein the execution of the processor-readable code is further configured to cause the wireless communication device to:
generate the first scrambler seed value, wherein each of the 7 LSBs of the first scrambler seed value has a value of zero.

14. A method for wireless communication performed at a receiving device, the method comprising:
receiving a first physical layer convergence protocol (PLCP) protocol data unit (PPDU) that includes a multi-user (MU) request-to-send (RTS) frame and a scrambler seed value, the scrambler seed value being associated with at least 11 bits, wherein at least one bit of a portion of the at least 11 bits has a non-zero value, the portion comprising 7 least significant bits (LSBs) of the scrambler seed value;
extracting a plurality of LSBs of the scrambler seed value;
in response to each of the extracted plurality of LSBs of the scrambler seed value having a zero value, modifying the extracted plurality of LSBs of the scrambler seed value by replacing at least one of the extracted plurality of LSBs with a non-zero value;
generating a scrambling sequence based on the modified extracted plurality of LSBs and a polynomial;
constructing a second PPDU that includes a clear-to-send (CTS) frame;
scrambling one or more portions of the second PPDU based on the scrambling sequence; and
transmitting a plurality of PPDU duplicates associated with the scrambled one or more portions of the second PPDU, each PPDU duplicate of the plurality of PPDU duplicates carrying the CTS frame.

15. The method of claim 14, wherein a frequency bandwidth spanned by the first PPDU received includes a plurality of 20 MHz frequency subbands, and each PPDU duplicate of the plurality of PPDU duplicates is transmitted on a corresponding 20 MHz frequency subband of the plurality of 20 MHz frequency subbands.

16. The method of claim 14, wherein the plurality of LSBs is associated with the 7 LSBs of the received scrambler seed value.

17. The method of claim 16, wherein the second PPDU includes a Service field that carries the 7 LSBs of the received scrambler seed value.

18. The method of claim 14, wherein generating the scrambling sequence includes:
selecting a configured scrambler seed value in response to each of one or more LSBs of the received scrambler seed value having a zero value; and
generating the scrambling sequence based on the configured scrambler seed value and the polynomial.

19. The method of claim 18, wherein the configured scrambler seed value is associated with 7 bits and is specified by the Institute of Electrical and Electronics Engineers (IEEE) 802.11 be amendment or later versions of the IEEE family of wireless communication standards.

20. The method of claim 19, wherein the configured scrambler seed value is one of "0000001" or "1111111".

21. The method of claim 14, wherein at least one of:
the scrambler seed value is associated with 11 bits or the polynomial comprises x11+x9+1.

22. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to cause the wireless communication device to:
receive a first physical layer convergence protocol (PLCP) protocol data unit (PPDU) that includes a multi-user (MU) request-to-send (RTS) frame and a scrambler seed value, the scrambler seed value being associated with at least 11 bits, wherein at least one bit of a portion of the at least 11 bits has a non-zero value, the portion comprising 7 least significant bits (LSBs) of the scrambler seed value;
extract a plurality of LSBs of the scrambler seed value;
in response to each of the extracted plurality of LSBs of the scrambler seed value having a zero value, modify the extracted plurality of LSBs of the scrambler seed value by replacing at least one of the extracted plurality of LSBs with a non-zero value;
generate a scrambling sequence based on the modified extracted plurality of LSBs and a polynomial;
construct a second PPDU that includes a clear-to-send (CTS) frame;
scramble one or more portions of the second PPDU based on the scrambling sequence; and
transmit a plurality of PPDU duplicates associated with the scrambled one or more portions of the second PPDU, each PPDU duplicate of the plurality of PPDU duplicates carrying the CTS frame.

23. The wireless communication device of claim 22, wherein a frequency bandwidth spanned by the first PPDU received includes a plurality of 20 MHz frequency subbands, and each PPDU duplicate of the plurality of PPDU duplicates is transmitted on a corresponding 20 MHz frequency subband of the plurality of 20 MHz frequency subbands.

24. The wireless communication device of claim 22, wherein the plurality of LSBs is associated with the 7 LSBs of the received scrambler seed value.

25. The wireless communication device of claim 24, wherein the second PPDU includes a Service field that carries the 7 LSBs of the received scrambler seed value.

26. The wireless communication device of claim 22, wherein the execution of the processor-readable code is further configured to cause the wireless communication device to:
select a configured scrambler seed value in response to each of one or more LSBs of the received scrambler seed value having a zero value; and
generate the scrambling sequence based on the configured scrambler seed value and the polynomial.

* * * * *